(12) United States Patent
Hendry

(10) Patent No.: US 12,501,047 B2
(45) Date of Patent: Dec. 16, 2025

(54) IMAGE DECODING METHOD COMPRISING DPB MANAGEMENT PROCESS AND APPARATUS THEREFOR

(71) Applicant: LG Electronics Inc., Seoul (KR)

(72) Inventor: Hendry Hendry, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/778,669

(22) PCT Filed: Dec. 29, 2020

(86) PCT No.: PCT/KR2020/019337
§ 371 (c)(1),
(2) Date: May 20, 2022

(87) PCT Pub. No.: WO2021/137598
PCT Pub. Date: Jul. 8, 2021

(65) Prior Publication Data
US 2022/0417519 A1 Dec. 29, 2022

Related U.S. Application Data

(60) Provisional application No. 62/955,357, filed on Dec. 30, 2019.

(51) Int. Cl.
*H04N 19/15* (2014.01)
*H04N 19/105* (2014.01)
(Continued)

(52) U.S. Cl.
CPC ......... *H04N 19/132* (2014.11); *H04N 19/105* (2014.11); *H04N 19/176* (2014.11); *H04N 19/423* (2014.11); *H04N 19/70* (2014.11)

(58) Field of Classification Search
CPC .. H04N 19/132; H04N 19/105; H04N 19/176; H04N 19/423; H04N 19/70;
(Continued)

(56) References Cited

U.S. PATENT DOCUMENTS 9,674,519 B2 * 6/2017 Chen .................... H04N 19/117
9,699,480 B2 * 7/2017 Deshpande ............ H04N 19/30
(Continued)

FOREIGN PATENT DOCUMENTS

CN 109462764 A 3/2019
JP 2017-517194 A 6/2017
(Continued)

OTHER PUBLICATIONS

H.264 Standard (Year: 2014).*
(Continued)

*Primary Examiner* — Philip P. Dang
(74) *Attorney, Agent, or Firm* — Fish & Richardson P.C.

(57) ABSTRACT

An image decoding method performed by a decoding apparatus, according to the present document, comprises the steps of: acquiring image information including decoded picture buffer (DPB) parameter information for output layer sets (OLSs) and an OLS DPB parameter index for a target OLS; and deriving DPB parameter information for the target OLS from among the DPB parameter information for the OLSs on the basis of the OLS DPB parameter index.

5 Claims, 16 Drawing Sheets

(51) Int. Cl.
*H04N 19/132* (2014.01)
*H04N 19/176* (2014.01)
*H04N 19/423* (2014.01)
*H04N 19/70* (2014.01)

(58) Field of Classification Search
CPC ........ H04N 19/30; H04N 19/51; H04N 19/13; H04N 19/137; H04N 19/44
See application file for complete search history.

(56) References Cited

U.S. PATENT DOCUMENTS

| | | | |
|---|---|---|---|
| 9,936,196 B2* | 4/2018 | Chen | H04N 19/70 |
| 10,187,662 B2* | 1/2019 | Deshpande | H04N 19/52 |
| 10,194,160 B2* | 1/2019 | Deshpande | H04N 19/44 |
| 10,250,895 B2* | 4/2019 | Deshpande | H04N 19/70 |
| 10,257,519 B2* | 4/2019 | Deshpande | H04N 19/15 |
| 10,448,040 B2 | 10/2019 | Deshpande | |
| 10,448,041 B2* | 10/2019 | Deshpande | H04N 19/177 |
| 10,499,068 B2* | 12/2019 | Hannuksela | H04N 19/33 |
| 2014/0301477 A1 | 10/2014 | Deshpande | |
| 2016/0366428 A1 | 12/2016 | Deshpande | |
| 2017/0019666 A1* | 1/2017 | Deshpande | H04N 19/423 |
| 2019/0007692 A1 | 1/2019 | Deshpande | |

FOREIGN PATENT DOCUMENTS

| | | |
|---|---|---|
| KR | 20080079669 | 9/2008 |
| KR | 10-2014-0090566 A | 7/2014 |
| KR | 101904625 | 10/2018 |
| WO | WO-2014167817 A1 * | 10/2014 ..... H04N 21/234327 |

OTHER PUBLICATIONS

H.265 Standard (Year: 2016).*
VVC Draft 7 (Year: 2019).*
Bross et al., "Versatile Video Coding (Draft 7)," JVET-P2001-vE, Presented at Joint Video Experts Team (JVET) of ITU-T SG 16 WP 3 and ISO/IEC JTC 1/SC 29/WG 11, 16th Meeting: Geneva, CH, Oct. 1-11, 2019, 489 pages.
Notice of Allowance in Chinese Appln. No. 202080097297.1, mailed on Jan. 27, 2025, 5 pages (with English translation).
Office Action in Korean Appln. No. 10-2022-7021606, mailed on Sep. 2, 2024, 12 pages (with English Translation).
Wang, "AHG8: Scalability—PTL and decoder capability," JVET-P0117-v3, Joint Video Experts Team (JVET) of ITU-T SG 16 WP 3 and ISO/IEC JTC 1/SC 29/WG 11, 16th Meeting: Geneva, CH, Oct. 1-11, 2019, 6 pages.

* cited by examiner

IMAGE DECODING METHOD COMPRISING DPB MANAGEMENT PROCESS AND APPARATUS THEREFOR

CROSS-REFERENCE TO RELATED APPLICATIONS

This application is a National Stage application under 35 U.S.C. § 371 of International Application No. PCT/KR2020/019337, filed on Dec. 29, 2020, which claims the benefit of U.S. Provisional Application No. 62/955,357, filed on Dec. 30, 2019. The disclosures of the prior applications are hereby incorporated by reference herein in their entirety.

BACKGROUND OF DISCLOSURE

Field of the Disclosure

This document relates to image coding technology, and more particularly, to an image decoding method for coding image information including DPB parameters mapped to OLS in an image coding system, and an apparatus therefor.

Related Art

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

The present disclosure provides a method and apparatus for improving image coding efficiency.

The present disclosure is also to provide a method and apparatus for deriving DPB parameters for OLS.

According to an embodiment of this document, an image decoding method performed by a decoding apparatus is provided. The method includes obtaining image information including decoded picture buffer (DPB) parameter information for output layer sets (OLSs) and an OLS DPB parameter index for a target OLS, deriving DPB parameter information for the target OLS among the DPB parameter information for the OLSs based on the OLS DPB parameter index, performing a picture management process for pictures of a DPB based on the DPB parameter information for the target OLS, obtaining prediction information and residual information for a block of a current picture, deriving a prediction sample by performing prediction for the block based on the prediction information and the pictures of the DPB, deriving a residual sample for the block based on the residual information, and generating a reconstructed sample for the block based on the prediction sample and the residual sample.

According to another embodiment of this document, a decoding apparatus for performing image decoding is provided. The decoding apparatus includes an entropy decoder configured to obtain image information including decoded picture buffer (DPB) parameter information for output layer sets (OLSs) and an OLS DPB parameter index for a target OLS, and obtain prediction information and residual information for a block of a current picture, a predictor configured to derive DPB parameter information for the target OLS among the DPB parameter information for the OLSs based on the OLS DPB parameter index, perform a picture management process for pictures of a DPB based on the DPB parameter information for the target OLS, and derive a prediction sample by performing prediction for the block based on the prediction information and the pictures of the DPB, a residual processor configured to derive a residual sample for the block based on the residual information, and an adder configured to generate a reconstructed sample for the block based on the prediction sample and the residual sample.

According to still another embodiment of this document, a video encoding method which is performed by an encoding apparatus is provided. The method includes generating decoded picture buffer (DPB) parameter information for output layer sets (OLSs) including DPB parameter information of a target OLS, generating an OLS DPB parameter index for the DPB parameter information of the target OLS, performing a picture management process for pictures of a DPB based on the DPB parameter information of the target OLS, performing decoding for a block in a current picture based on the pictures of the DPB, and encoding image information including the DPB parameter information for the OLSs, the OLS DPB parameter index, prediction information for the block, and residual information.

According to still another embodiment of this document, a video encoding apparatus is provided. The encoding apparatus includes an entropy encoder configured to generate decoded picture buffer (DPB) parameter information for output layer sets (OLSs) including DPB parameter information of a target OLS, generate an OLS DPB parameter index for the DPB parameter information of the target OLS, and encode image information including the DPB parameter information for the OLSs, the OLS DPB parameter index, prediction information for a block in a current picture, and residual information, a DPB configured to perform a picture management process for pictures of a DPB based on the DPB parameter information of the target OLS, and a predictor configured to perform decoding for a block in a current picture based on the pictures of the DPB.

According to still another embodiment of this document, there is provided a computer-readable digital storage medium that stores a bitstream including image information, which causes a decoding apparatus to perform an image decoding method. In the computer-readable storage medium, the image decoding method includes obtaining image information including decoded picture buffer (DPB) parameter information for output layer sets (OLSs) and an OLS DPB parameter index for a target OLS, deriving DPB parameter information for the target OLS among the DPB parameter information for the OLSs based on the OLS DPB parameter index, performing a picture management process for pictures of a DPB based on the DPB parameter information for the target OLS, obtaining prediction information and residual information for a block of a current picture; deriving a prediction sample by performing prediction for the block based on the prediction information and the pictures of the DPB, deriving a residual sample for the block based on the residual information, and generating a reconstructed sample for the block based on the prediction sample and the residual sample.

According to this document, it is possible to signal the DPB parameter for the OLS, and through this, the DPB can be updated adaptively to the OLS, and overall coding efficiency can be improved.

According to this document, index information indicating a DPB parameter for OLS can be signaled, and through this, the DPB parameter can be derived adaptively to OLS, and the overall coding efficiency can be improved by updating the DPB for OLS based on the derived DPB parameter.

DESCRIPTION OF EMBODIMENTS

Figure 1:
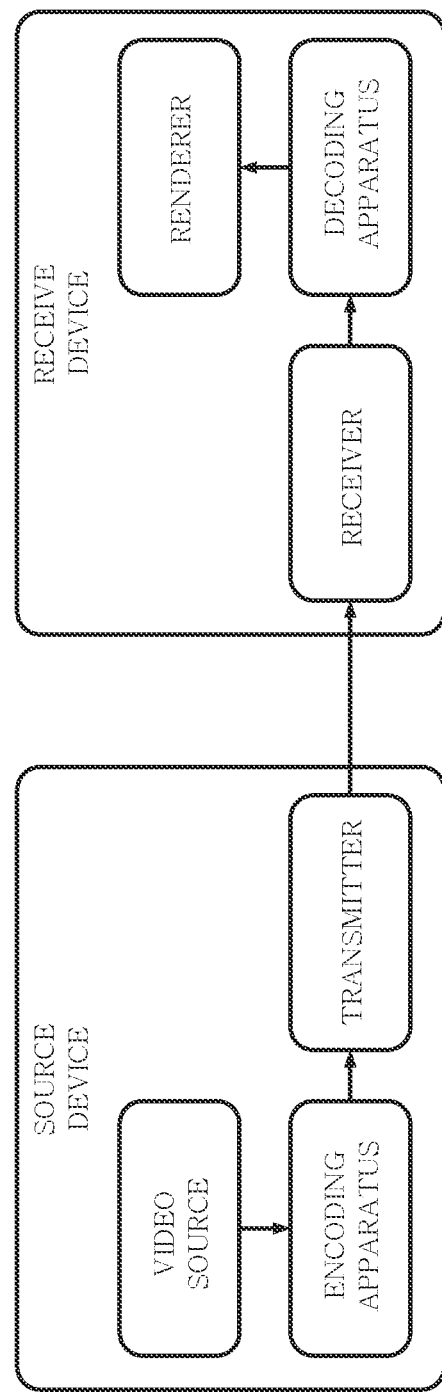
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (ie, intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
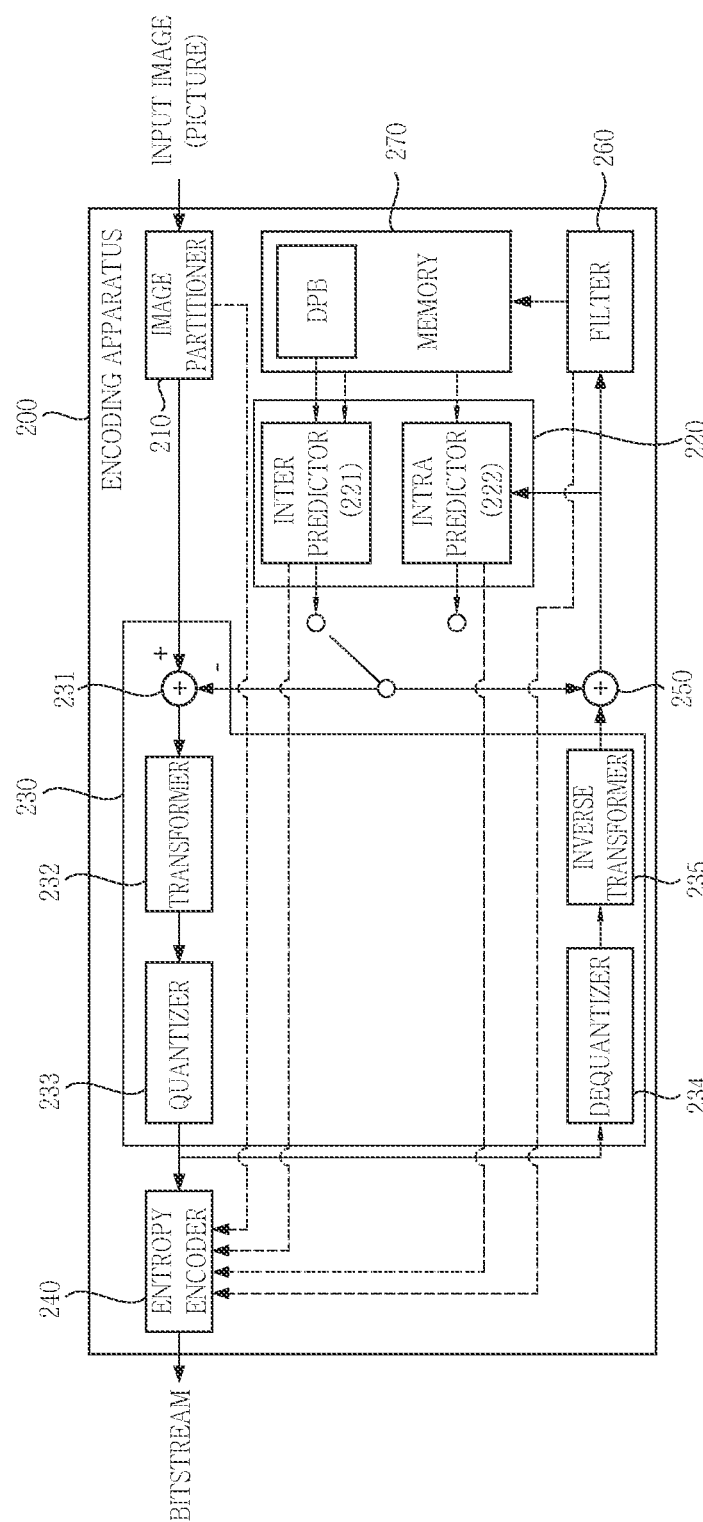
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
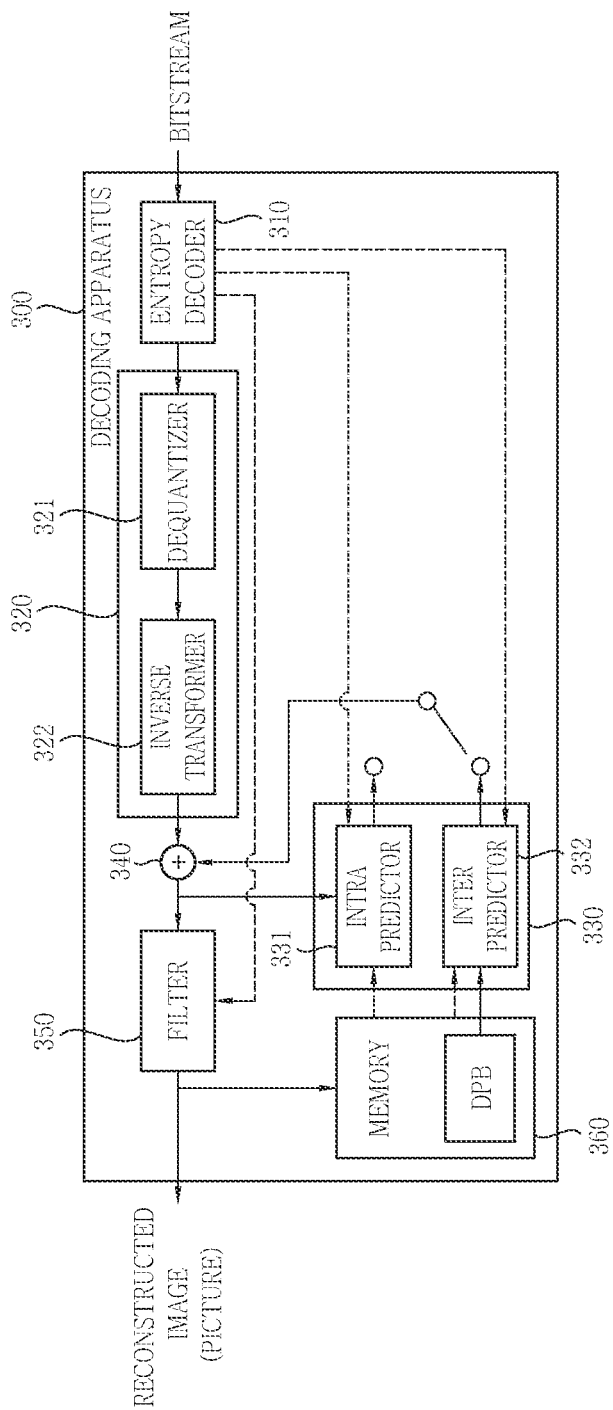
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

In the present disclosure, at least one of quantization/inverse quantization and/or transform/inverse transform may be omitted. When the quantization/inverse quantization is omitted, the quantized transform coefficients may be called transform coefficients. When the transform/inverse transform is omitted, the transform coefficients may be called coefficients or residual coefficients, or may still be called transform coefficients for uniformity of expression.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or the information on the transform coefficient(s)), and scaled transform coefficients may be derived by inverse transforming (scaling) on the transform coefficients. Residual samples may be derived based on the inverse transforming (transforming) on the scaled transform coefficients. This may be applied/expressed in other parts of the present disclosure as well.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Intra prediction may refer to prediction that generates prediction samples for a current block based on reference samples in a picture to which the current block belongs (hereinafter, referred to as a current picture). When the intra prediction is applied to the current block, neighboring reference samples to be used for the intra prediction of the current block may be derived. The neighboring reference samples of the current block may include a sample adjacent to the left boundary of the current block of size nW×nH and a total of 2×nH samples adjacent to the bottom-left of the current block, a sample adjacent to the top boundary of the current block and a total of 2×nW samples adjacent to the top-right and a sample adjacent to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to the right boundary of the current block of size nW×nH, a total of nW samples adjacent to the bottom boundary of the current block and a sample adjacent to the bottom-right of the current block.

However, some of the neighboring reference samples of the current block have not yet been decoded or may not be available. In this case, the decoder may construct neighboring reference samples to be used for prediction by substituting unavailable samples with available samples. Alternatively, neighboring reference samples to be used for prediction may be configured through interpolation of available samples.

When the neighboring reference samples are derived, (i) a prediction sample may be derived based on the average or interpolation of neighboring reference samples of the current block, or (ii) the prediction sample may be derived based on a reference sample existing in a specific (prediction) direction with respect to a prediction sample among the neighboring reference samples of the current block. The case of (i) may be called a non-directional mode or a non-angular mode, and the case of (ii) may be called a directional mode or an angular mode.

In addition, the prediction sample may be generated through interpolation of a first neighboring sample located in the prediction direction of the intra prediction mode of the current block based on the prediction sample of the current block and a second neighboring sample located in a direction opposite to the prediction direction among the neighboring reference samples. The above-described case may be referred to as linear interpolation intra prediction (LIP). In addition, chroma prediction samples may be generated based on the luma samples using a linear model (LM). This case may be called an LM mode or a chroma component LM (CCLM) mode.

In addition, a temporary prediction sample of the current block is derived based on the filtered neighboring reference samples, and a prediction sample of the current block may also be derived by weighted summing the temporary prediction sample and at least one reference sample derived according to the intra prediction mode among the existing neighboring reference samples, that is, unfiltered neighboring reference samples. The above-described case may be referred to as position dependent intra prediction (PDPC).

In addition, a reference sample line with the highest prediction accuracy among neighboring multiple reference sample lines of the current block is selected, and a prediction sample is derived using a reference sample located in the prediction direction in the selected line. In this case, intra prediction encoding may be performed by indicating (signaling) the used reference sample line to the decoding apparatus. The above-described case may be referred to as multi-reference line intra prediction or MRL-based intra prediction.

In addition, the current block is divided into vertical or horizontal sub-partitions and intra prediction is performed based on the same intra prediction mode, but neighboring reference samples may be derived and used in units of the sub-partitions. That is, in this case, the intra prediction mode for the current block is equally applied to the sub-partitions, but the intra prediction performance may be improved in some cases by deriving and using the neighboring reference samples in units of the sub-partitions. This prediction method may be called intra-prediction based on intra sub-partitions (ISP).

The above-described intra prediction methods may be called intra prediction types to be distinguished from the intra prediction mode. The intra prediction types may be referred to by various terms such as intra prediction technique or additional intra prediction modes. For example, the intra prediction types (or additional intra prediction modes, etc.) may include at least one of the aforementioned LIP, PDPC, MRL, and ISP. A general intra prediction method excluding a specific intra prediction type such as LIP, PDPC, MRL, and ISP may be referred to as a normal intra prediction type. The normal intra prediction type may be generally applied when the above specific intra prediction type is not applied, and prediction may be performed based on the above-described intra prediction mode. Meanwhile, if necessary, post-processing filtering may be performed on the derived prediction sample.

Specifically, the intra prediction process may include an intra prediction mode/type determination step, neighboring reference samples derivation step, and an intra prediction mode/type based prediction sample derivation step. In addition, if necessary, a post-filtering step may be performed on the derived prediction sample.

Figure 4:
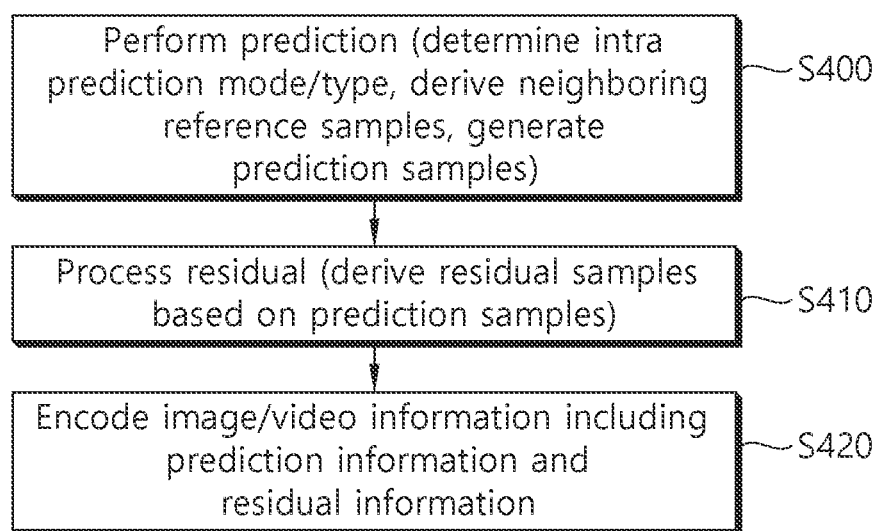
FIG. 4 illustrates an example of an intra prediction-based video/image encoding method.

FIG. 4 illustrates an example of an intra prediction-based video/image encoding method.

Referring to FIG. 4, the encoding device performs intra prediction on the current block S400. The encoding device derives an intra prediction mode/type for the current block, derives neighboring reference samples of the current block, generates prediction samples in the current block based on the intra prediction mode/type and the neighboring reference samples. Here, the intra prediction mode/type determination, neighboring reference samples derivation, and prediction samples generation procedures may be performed simultaneously, or one procedure may be performed before another procedure. The encoding device may determine a mode/type applied to the current block from among a plurality of intra prediction modes/types. The encoding device may compare RD costs for the intra prediction mode/types and determine an optimal intra prediction mode/type for the current block.

Meanwhile, the encoding device may perform a prediction sample filtering procedure. The prediction sample filtering may be referred to as post filtering. Some or all of the prediction samples may be filtered by the prediction sample filtering procedure. In some cases, the prediction sample filtering procedure may be omitted.

The encoding device generates residual samples for the current block based on the (filtered) prediction samples S410. The encoding device may compare the prediction samples in the original samples of the current block based on the phase and derive the residual samples.

The encoding device may encode image information including information on the intra prediction (prediction information) and residual information on the residual samples S420. The prediction information may include the intra prediction mode information and the intra prediction type information. The encoding device may output encoded image information in the form of a bitstream. The output bitstream may be transmitted to the decoding device through a storage medium or a network.

The residual information may include residual coding syntax, which will be described later. The encoding device may transform/quantize the residual samples to derive quantized transform coefficients. The residual information may include information on the quantized transform coefficients.

Meanwhile, as described above, the encoding device may generate a reconstructed picture (including reconstructed samples and reconstructed blocks). To this end, the encoding device may derive (modified) residual samples by performing inverse quantization/inverse transformation on the quantized transform coefficients again. The reason for performing the inverse quantization/inverse transformation again after transforming/quantizing the residual samples in this way is to derive the same residual samples as the residual samples derived in the decoding device as described above. The encoding device may generate a reconstructed block including reconstructed samples for the current block based on the prediction samples and the (modified) residual samples. A reconstructed picture for the current picture may be generated based on the reconstructed block. As described above, an in-loop filtering procedure may be further applied to the reconstructed picture.

Figure 5:
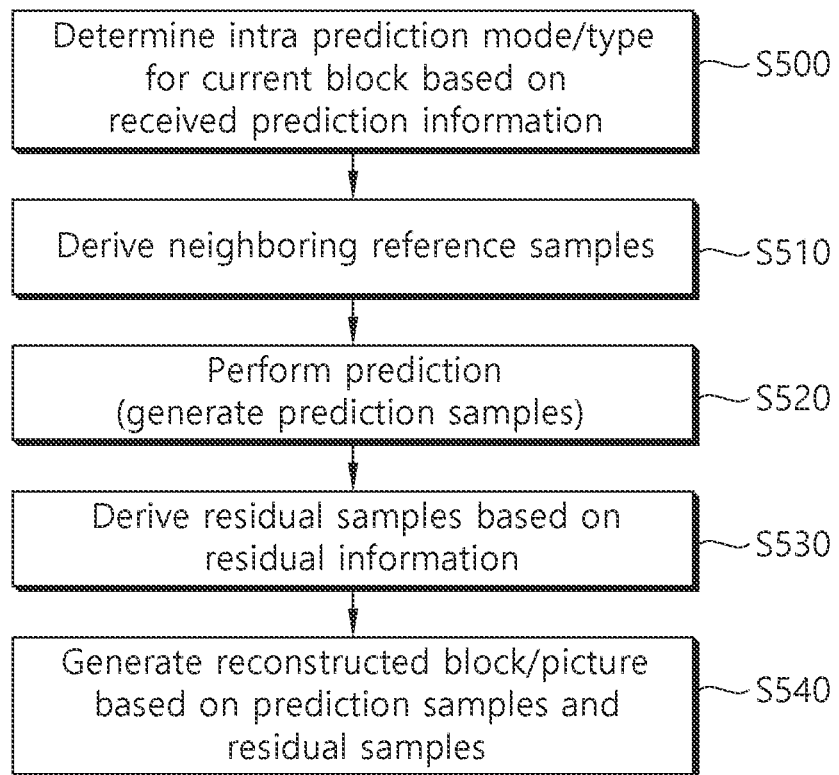
FIG. 5 illustrates an example of an intra prediction-based video/image decoding method.

FIG. 5 illustrates an example of an intra prediction-based video/image decoding method.

The decoding device may perform an operation corresponding to the operation performed by the encoding apparatus.

Prediction information and residual information may be obtained from a bitstream. Residual samples for the current block may be derived based on the residual information. Specifically, transform coefficients may be derived by performing inverse quantization based on the quantized transform coefficients derived based on the residual information, residual samples for the current block may be derived by performing inverse transform on the transform coefficients.

Specifically, the decoding device may derive the intra prediction mode/type for the current block based on the received prediction information (intra prediction mode/type information) S500. The decoding device may derive neighboring reference samples of the current block S510. The decoding device generates prediction samples in the current block based on the intra prediction mode/type and the neighboring reference samples S520. In this case, the decoding device may perform a prediction sample filtering procedure. The Predictive sample filtering may be referred to as post filtering. Some or all of the prediction samples may be filtered by the prediction sample filtering procedure. In some cases, the prediction sample filtering procedure may be omitted.

The decoding device generates residual samples for the current block based on the received residual information S530. The decoding device may generate reconstructed samples for the current block based on the prediction samples and the residual samples, and may derive a reconstructed block including the reconstructed samples S540. A reconstructed picture for the current picture may be generated based on the reconstructed block. As described above, an in-loop filtering procedure may be further applied to the reconstructed picture.

The intra prediction mode information may include, for example, flag information (ex. intra_luma_mpm_flag) indicating whether MPM (most probable mode) is applied to the current block or whether a remaining mode is applied, and, when the MPM is applied to the current block, the prediction mode information may further include index information (eg, intra_luma_mpm_idx) indicating one of the intra prediction mode candidates (MPM candidates). The intra prediction mode candidates (MPM candidates) may be constructed of an MPM candidate list or an MPM list. In addition, when the MPM is not applied to the current block, the intra prediction mode information includes remaining mode information (ex. intra_luma_mpm_remainder) indicating one of the remaining intra prediction modes except for the intra prediction mode candidates (MPM candidates). The decoding device may determine the intra prediction mode of the current block based on the intra prediction mode information.

Also, the intra prediction type information may be implemented in various forms. For example, the intra prediction type information may include intra prediction type index information indicating one of the intra prediction types. As another example, the intra prediction type information may include at least one of reference sample line information (ex. intra_luma_ref_idx) representing whether the MRL is applied to the current block and, if applied, which reference sample line is used, ISP flag information representing whether the ISP is applied to the current block (ex. intra_subpartitions_mode_flag), ISP type information indicating a split type of subpartitions when the ISP is applied (ex. intra_subpartitions_split_flag), flag information representing whether the PDPC is applied or flag information representing whether the LIP is applied. Also, the intra prediction type information may include a MIP flag representing whether matrix-based intra prediction (MIP) is applied to the current block.

The intra prediction mode information and/or the intra prediction type information may be encoded/decoded through a coding method described in the present disclosure. For example, the intra prediction mode information and/or the intra prediction type information may be encoded/decoded through entropy coding (eg, CABAC, CAVLC).

Figure 6:
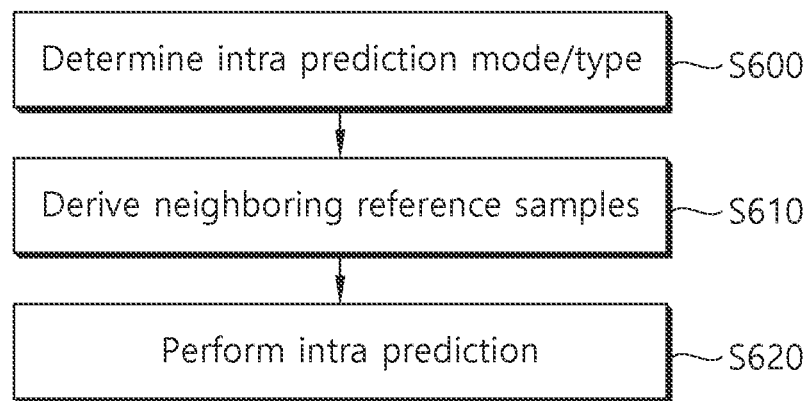
FIG. 6 schematically shows an intra prediction procedure.

FIG. 6 schematically shows an intra prediction procedure.

Referring to FIG. 6, as described above, the intra prediction procedure may include a step of determinating an intra prediction mode/type, a step of deriving neighboring reference samples, and a step of performing intra prediction (generating a prediction sample). The intra prediction procedure may be performed by the encoding device and the decoding device as described above. In the present disclosure, a coding device may include the encoding device and/or the decoding device.

Referring to FIG. 6, the coding device determines an intra prediction mode/type S600.

The encoding device may determine an intra prediction mode/type applied to the current block from among the various intra prediction modes/types described above, and may generate prediction related information. The prediction related information may include intra prediction mode information representing an intra prediction mode applied to the current block and/or intra prediction type information representing an intra prediction type applied to the current block. The decoding device may determine an intra prediction mode/type applied to the current block based on the prediction related information.

The intra prediction mode information may include, for example, flag information (ex. intra_luma_mpm_flag) representing whether a most probable mode (MPM) is applied to the current block or a remaining mode is applied, and the When the MPM is applied to the current block, the prediction mode information may further include index information (eg, intra_luma_mpm_idx) indicating one of the intra prediction mode candidates (MPM candidates). The intra prediction mode candidates (MPM candidates) may be constructed of an MPM candidate list or an MPM list. In addition, when the MPM is not applied to the current block, the intra prediction mode information may further include remaining mode information (ex. intra_luma_mpm_remainder) indicating one of the remaining intra prediction modes except for the intra prediction mode candidates (MPM candidates). The decoding device may determine the intra prediction mode of the current block based on the intra prediction mode information.

In addition, the intra prediction type information may be implemented in various forms. For example, the intra prediction type information may include intra prediction type index information indicating one of the intra prediction types. As another example, the intra prediction type information may include at least one of reference sample line information (ex. intra_luma_ref_idx) representing whether the MRL is applied to the current block and, if applied, which reference sample line is used, ISP flag information representing whether the ISP is applied to the current block (ex. intra_subpartitions_mode_flag), ISP type information indicating a split type of subpartitions when the ISP is applied (ex. intra_subpartitions_split_flag), flag information representing whether the PDPC is applied or flag information representing whether the LIP is applied. Also, the intra prediction type information may include a MIP flag representing whether matrix-based intra prediction (MIP) is applied to the current block.

For example, when intra prediction is applied, an intra prediction mode applied to the current block may be determined using an intra prediction mode of a neighboring block. For example, the coding device may select one of most probable mode (MPM) candidates in the MPM list derived based on additional candidate modes and/or an intra prediction mode of the neighboring block (eg, the left and/or top neighboring block) of the current block, or select one of the remaining intra prediction modes not included in the MPM candidates (and planar mode) based on the MPM remainder information (remaining intra prediction mode information). The MPM list may be configured to include or not include the planner mode as a candidate. For example, when the MPM list includes a planner mode as a candidate, the MPM list may have 6 candidates, and when the MPM list does not include a planner mode as a candidate, the MPM list may have 5 candidates. When the MPM list does not include the planar mode as a candidate, a not planar flag (ex. intra_luma_not_planar_flag) representing whether the intra prediction mode of the current block is not the planar mode may be signaled. For example, the MPM flag may be signaled first, and the MPM index and not planner flag may be signaled when the value of the MPM flag is 1. Also, the MPM index may be signaled when the value of the not planner flag is 1. Here, the fact that the MPM list is configured not to include the planner mode as a candidate is that the planner mode is always considered as MPM rather than that the planner mode is not MPM, thus, the flag (not planar flag) is signaled first to check whether it is the planar mode.

For example, whether the intra prediction mode applied to the current block is among the MPM candidates (and the planar mode) or the remaining modes may be indicated based on the MPM flag (eg, intra_luma_mpm_flag). The MPM flag with a value of 1 may indicate that the intra prediction mode for the current block is within MPM candidates (and planar mode), and The MPM flag with a value of 0 may indicate that the intra prediction mode for the current block is not within MPM candidates (and planar mode). The not planar flag (ex. intra_luma_not_planar_flag) with a value of 0 may indicate that the intra prediction mode for the current block is a planar mode, and the not planar flag with a value of 1 may indicate that the intra prediction mode for the current block is not the planar mode. The MPM index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. For example, the remaining intra prediction mode information may indicate one of the remaining intra prediction modes not included in the MPM candidates (and planar mode) among all intra prediction modes by indexing in the order of prediction mode number. The intra prediction mode may be an intra prediction mode for a luma component (sample). Hereinafter, the intra prediction mode information may include at least one of the MPM flag (ex. intra_luma_mpm_flag), the not planar flag (ex. intra_luma_not_planar_flag), the MPM index (ex. mpm_idx or intra_luma_mpm_idx), or the remaining intra prediction mode information (rem_intra_luma_luma_mpm_mode or intra_luma_mpminder). In the present disclosure, the MPM list may be referred to by various terms such as an MPM candidate list and candModeList.

When the MIP is applied to the current block, a separate mpm flag (ex. intra_mip_mpm_flag) for the MIP, an mpm index (ex. intra_mip_mpm_idx), and remaining intra prediction mode information (ex. intra_mip_mpm_remainder) may be signaled, and the not planar flag may not be signaled.

In other words, in general, when a block partition for an image is performed, the current block to be coded and a neighboring block have similar image characteristics. Therefore, there is a high probability that the current block and the neighboring block have the same or similar intra prediction mode. Accordingly, the encoder may use the intra prediction mode of the neighboring block to encode the intra prediction mode of the current block.

The coding device may construct a most probable modes (MPM) list for the current block. The MPM list may be referred to as the MPM candidate list. Here, the MPM may refer to modes used to improve coding efficiency in consideration of the similarity between the current block and the neighboring blocks during intra prediction mode coding. As described above, the MPM list may be constructed to include the planar mode, or may be constructed to exclude the planar mode. For example, when the MPM list includes the planar mode, the number of candidates in the MPM list may be 6. And, when the MPM list does not include the planar mode, the number of candidates in the MPM list may be 5.

The encoding device may perform prediction based on various intra prediction modes, and may determine an optimal intra prediction mode based on rate-distortion optimization (RDO) based thereon. In this case, the encoding device may determine the optimal intra prediction mode by using only the MPM candidates and planar mode configured in the MPM list, or by further using the remaining intra prediction modes as well as the MPM candidates and planar mode configured in the MPM list. Specifically, for example, if the intra prediction type of the current block is a specific type (ex. LIP, MRL, or ISP) other than the normal intra prediction type, the encoding device may determine the optimal intra prediction mode by considering only the MPM candidates and the planar mode as intra prediction mode candidates for the current block. That is, in this case, the intra prediction mode for the current block may be determined only from among the MPM candidates and the planar mode, and in this case, encoding/signaling of the mpm flag may not be performed. In this case, the decoding device may infer that the mpm flag is 1 without separately signaling the mpm flag.

Meanwhile, in general, when the intra prediction mode of the current block is not the planar mode and is one of the MPM candidates in the MPM list, the encoding device generates an mpm index (mpm idx) indicating one of the MPM candidates. when the intra prediction mode of the current block is not included in the MPM list, the encoding device generates MPM reminder information (remaining intra prediction mode information) indicating the same mode as the intra prediction mode of the current block among the remaining intra prediction modes not included in the MPM list (and planar mode). The MPM reminder information may include, for example, an intra_luma_mpm_remainder syntax element.

The decoding device obtains intra prediction mode information from the bitstream. As described above, the intra prediction mode information may include at least one of an MPM flag, a not planner flag, an MPM index, and MPM remaster information (remaining intra prediction mode information). The decoding device may construct the MPM list. The MPM list is constructed the same as the MPM list constructed in the encoding device. That is, the MPM list may include intra prediction modes of neighboring blocks, or may further include specific intra prediction modes according to a predetermined method.

The decoding device may determine the intra prediction mode of the current block based on the MPM list and the intra prediction mode information. For example, when the value of the MPM flag is 1, the decoding device may derive the planar mode as the intra prediction mode of the current block (based on not planar flag) or derive the candidate indicated by the MPM index from among the MPM candidates in the MPM list as the intra prediction mode of the current block. Here, the MPM candidates may represent only candidates included in the MPM list, or may include not only candidates included in the MPM list but also the planar mode applicable when the value of the MPM flag is 1.

As another example, when the value of the MPM flag is 0, the decoding device may derive an intra prediction mode indicated by the remaining intra prediction mode information (which may be referred to as mpm remainder information) among the remaining intra prediction modes not included in the MPM list and the planner mode as the intra prediction mode of the current block. Meanwhile, as another example, when the intra prediction type of the current block is a specific type (ex. LIP, MRL or ISP, etc.), the decoding device may derive a candidate indicated by the MPM flag in the planar mode or the MPM list as the intra prediction mode of the current block without parsing/decoding/checking the MPM flag.

The coding device derives neighboring reference samples of the current block S610. When intra prediction is applied to the current block, the neighboring reference samples to be used for the intra prediction of the current block may be derived. The neighboring reference samples of the current block may include a sample adjacent to the left boundary of the current block of size nW×nH and a total of 2×nH samples adjacent to the bottom-left of the current block, a sample adjacent to the top boundary of the current block and a total of 2×nW samples adjacent to the top-right and a sample adjacent to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to the right boundary of the current block of size nW×nH, a total of nW samples adjacent to the bottom boundary of the current block and a sample adjacent to the bottom-right of the current block.

On the other hand, when the MRL is applied (that is, when the value of the MRL index is greater than 0), the neighboring reference samples may be located on lines 1 to 2 instead of line 0 adjacent to the current block on the left/top side, and in this case, the number of the neighboring reference samples may be further increased. Meanwhile, when the ISP is applied, the neighboring reference samples may be derived in units of sub-partitions.

The coding device derives prediction samples by performing intra prediction on the current block S620. The coding device may derive the prediction samples based on the intra prediction mode/type and the neighboring samples. The coding device may derive a reference sample according to an intra prediction mode of the current block among neighboring reference samples of the current block, and may derive a prediction sample of the current block based on the reference sample.

Meanwhile, when inter prediction is applied, the predictor of the encoding apparatus/decoding apparatus may derive prediction samples by performing inter prediction in units of blocks. The inter prediction may be applied when performing the prediction on the current block. That is, the predictor (more specifically, inter predictor) of the encoding/decoding apparatus may derive prediction samples by performing the inter prediction in units of the block. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information. In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and./or reference picture index of the current block. The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

The motion information may further include L0 motion information and/or L1 motion information according to the inter-prediction type (L0 prediction, L1 prediction, Bi prediction, etc.). A L0-direction motion vector may be referred to as an L0 motion vector or MVL0 and an L1-direction motion vector may be referred to as an L1 motion vector or MVL1. A prediction based on the L0 motion vector may be referred to as an L0 prediction, a prediction based on the L1 motion vector may be referred to as an L1 prediction, and a prediction based on both the L0 motion vector and the L1 motion vector may be referred to as a bi-prediction. Here, the L0 motion vector may indicate a motion vector associated with a reference picture list L0 and the L1 motion vector may indicate a motion vector associated with a reference picture list L1. The reference picture list L0 may include pictures prior to the current picture in an output order and the reference picture list L1 may include pictures subsequent to the current picture in the output order, as the reference pictures. The prior pictures may be referred to as a forward (reference) picture and the subsequent pictures may be referred to as a reverse (reference) picture. The reference picture list L0 may further include the pictures subsequent to the current picture in the output order as the reference pictures. In this case, the prior pictures may be first indexed in the reference picture list L0 and the subsequent pictures may then be indexed. The reference picture list L1 may further include the pictures prior to the current picture in the output order as the reference pictures. In this case, the subsequent pictures may be first indexed in the reference picture list L1 and the prior pictures may then be indexed. Here, the output order may correspond to a picture order count (POC) order.

A video/image encoding process based on inter prediction may schematically include, for example, the following.

Figure 7:
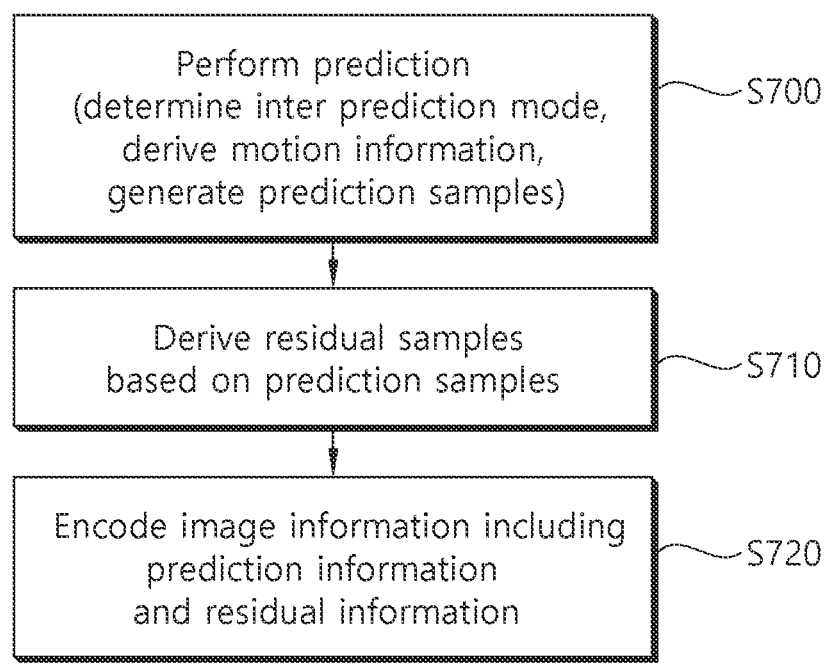
FIG. 7 illustrates an example of an inter prediction-based video/image encoding method.

FIG. 7 illustrates an example of an inter prediction-based video/image encoding method.

The encoding apparatus performs the inter prediction for the current block (S700). The encoding apparatus may derive the inter prediction mode and the motion information of the current block and generate the prediction samples of the current block. Here, an inter prediction mode determining process, a motion information deriving process, and a generation process of the prediction samples may be simultaneously performed and any one process may be performed earlier than other process. For example, the inter-prediction unit of the encoding apparatus may include a prediction mode determination unit, a motion information derivation unit, and a prediction sample derivation unit, and the prediction mode determination unit may determine the prediction mode for the current block, the motion information derivation unit may derive the motion information of the current block, and the prediction sample derivation unit may derive the prediction samples of the current block. For example, the inter-prediction unit of the encoding apparatus may search a block similar to the current block in a predetermined area (search area) of reference pictures through motion estimation and derive a reference block in which a difference from the current block is minimum or is equal to or less than a predetermined criterion. A reference picture index indicating a reference picture at which the reference block is positioned may be derived based thereon and a motion vector may be derived based on a difference in location between the reference block and the current block. The encoding apparatus may determine a mode applied to the current block among various prediction modes. The encoding apparatus may compare RD cost for the various prediction modes and determine an optimal prediction mode for the current block.

For example, when the skip mode or the merge mode is applied to the current block, the encoding apparatus may configure a merging candidate list to be described below and derive a reference block in which a difference from the current block is minimum or is equal to or less than a predetermined criterion among reference blocks indicated by merge candidates included in the merging candidate list. In this case, a merge candidate associated with the derived reference block may be selected and merge index information indicating the selected merge candidate may be generated and signaled to the decoding apparatus. The motion information of the current block may be derived by using the motion information of the selected merge candidate.

As another example, when an (A)MVP mode is applied to the current block, the encoding apparatus may configure an (A)MVP candidate list to be described below and use a motion vector of a selected mvp candidate among motion vector predictor (mvp) candidates included in the (A)MVP candidate list as the mvp of the current block. In this case, for example, the motion vector indicating the reference block derived by the motion estimation may be used as the motion vector of the current block and an mvp candidate having a motion vector with a smallest difference from the motion vector of the current block among the mvp candidates may become the selected mvp candidate. A motion vector difference (MVD) which is a difference obtained by subtracting the mvp from the motion vector of the current block may be derived. In this case, the information on the MVD may be signaled to the decoding apparatus. Further, when the (A)MVP mode is applied, the value of the reference picture index may be configured as reference picture index information and separately signaled to the decoding apparatus.

The encoding apparatus may derive the residual samples based on the predicted samples (S710). The encoding apparatus may derive the residual samples by comparing original samples and the prediction samples of the current block.

The encoding apparatus encodes image information including prediction information and residual information (S720). The encoding apparatus may output the encoded image information in the form of a bitstream. The prediction information may include information on prediction mode information (e.g., skip flag, merge flag or mode index, etc.) and information on motion information as information related to the prediction procedure. The information on the motion information may include candidate selection information (e.g., merge index, mvp flag or mvp index) which is information for deriving the motion vector. Further, the information on the motion information may include the information on the MVD and/or the reference picture index information. Further, the information on the motion information may include information indicating whether to apply the L0 prediction, the L1 prediction, or the bi-prediction. The residual information is information on the residual samples. The residual information may include information on quantized transform coefficients for the residual samples.

An output bitstream may be stored in a (digital) storage medium and transferred to the decoding apparatus or transferred to the decoding apparatus via the network.

Meanwhile, as described above, the encoding apparatus may generate a reconstructed picture (including reconstructed samples and reconstructed blocks) based on the reference samples and the residual samples. This is to derive the same prediction result as that performed by the decoding apparatus, and as a result, coding efficiency may be increased. Accordingly, the encoding apparatus may store the reconstruction picture (or reconstruction samples or reconstruction blocks) in the memory and utilize the reconstruction picture as the reference picture. The in-loop filtering process may be further applied to the reconstruction picture as described above.

A video/image decoding process based on inter prediction may schematically include, for example, the following.

Figure 8:
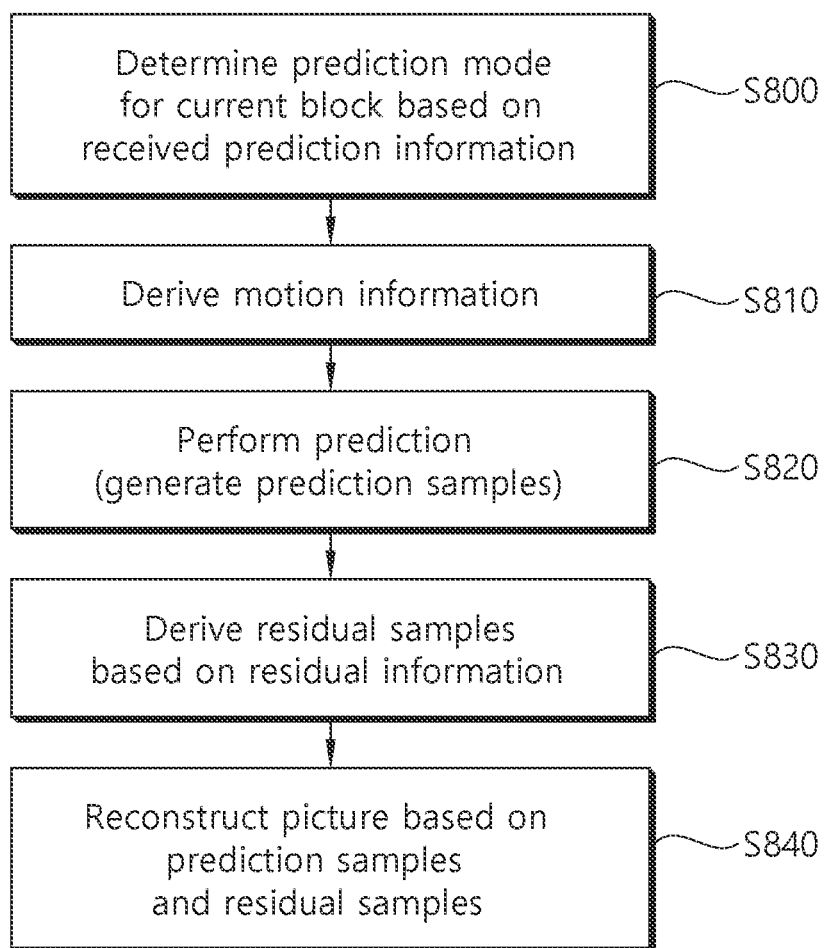
FIG. 8 illustrates an example of an inter prediction-based video/image decoding method.

FIG. 8 illustrates an example of an inter prediction-based video/image decoding method.

Referring to FIG. 8, the decoding apparatus may perform an operation corresponding to the operation performed by the encoding apparatus. The decoding apparatus may perform the prediction for the current block based on received prediction information and derive the prediction samples.

Specifically, the decoding apparatus may determine the prediction mode for the current block based on the received prediction information (S800). The decoding apparatus may determine which inter prediction mode is applied to the current block based on the prediction mode information in the prediction information.

For example, it may be determined whether the merge mode or the (A)MVP mode is applied to the current block based on the merge flag. Alternatively, one of various inter prediction mode candidates may be selected based on the mode index. The inter prediction mode candidates may include a skip mode, a merge mode, and/or an (A)MVP mode or may include various inter prediction modes to be described below.

The decoding apparatus derives the motion information of the current block based on the determined inter prediction mode (S810). For example, when the skip mode or the merge mode is applied to the current block, the decoding apparatus may configure the merge candidate list to be described below and select one merge candidate among the merge candidates included in the merge candidate list. Here, the selection may be performed based on the selection information (merge index). The motion information of the current block may be derived by using the motion information of the selected merge candidate. The motion information of the selected merge candidate may be used as the motion information of the current block.

As another example, when an (A)MVP mode is applied to the current block, the decoding apparatus may configure an (A)MVP candidate list to be described below and use a motion vector of a selected mvp candidate among motion vector predictor (mvp) candidates included in the (A)MVP candidate list as the mvp of the current block. Here, the selection may be performed based on the selection information (mvp flag or mvp index). In this case, the MVD of the current block may be derived based on the information on the MVD, and the motion vector of the current block may be derived based on the mvp of the current block and the MVD.

Further, the reference picture index of the current block may be derived based on the reference picture index information. The picture indicated by the reference picture index in the reference picture list for the current block may be derived as the reference picture referred for the inter prediction of the current block.

Meanwhile, as described below, the motion information of the current block may be derived without a candidate list configuration and in this case, the motion information of the current block may be derived according to a procedure disclosed in the prediction mode. In this case, the candidate list configuration may be omitted.

The decoding apparatus may generate the prediction samples for the current block based on the motion information of the current block (S820). In this case, the reference picture may be derived based on the reference picture index of the current block and the prediction samples of the current block may be derived by using the samples of the reference block indicated by the motion vector of the current block on the reference picture. In this case, in some cases, a predicted sample filtering procedure for all or some of the prediction samples of the current block may be further performed.

For example, the inter-prediction unit of the decoding apparatus may include a prediction mode determination unit, a motion information derivation unit, and a prediction sample derivation unit, and the prediction mode determination unit may determine the prediction mode for the current block based on the received prediction mode information, the motion information derivation unit may derive the motion information (the motion vector and/or reference picture index) of the current block based on the information on the received motion information, and the prediction sample derivation unit may derive the predicted samples of the current block.

The decoding apparatus generates the residual samples for the current block based on the received residual information (S830). The decoding apparatus may generate the reconstruction samples for the current block based on the prediction samples and the residual samples and generate the reconstruction picture based on the generated reconstruction samples (S840). Thereafter, the in-loop filtering procedure may be further applied to the reconstruction picture as described above.

Figure 9:
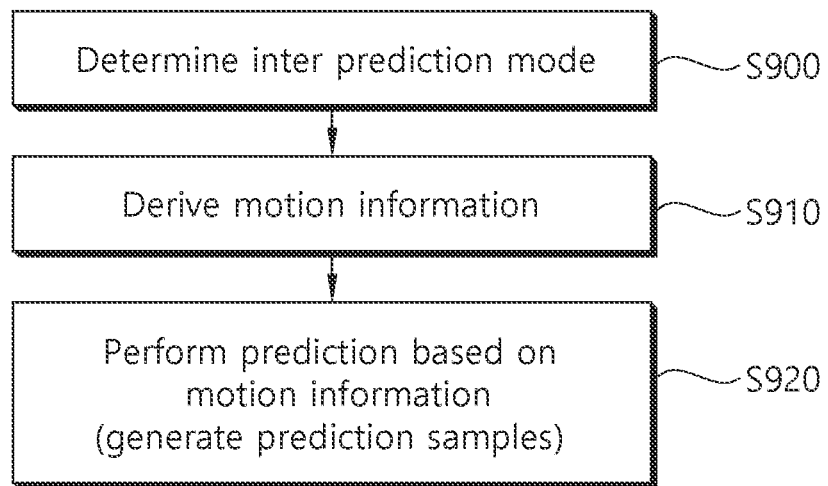
FIG. 9 schematically shows an inter prediction procedure.

FIG. 9 schematically shows an inter prediction procedure.

Referring to FIG. 9, as described above, the inter prediction process may include an inter prediction mode determination step, a motion information derivation step according to the determined prediction mode, and a prediction processing (prediction sample generation) step based on the derived motion information. The inter prediction process may be performed by the encoding apparatus and the decoding apparatus as described above. In this document, a coding device may include the encoding apparatus and/or the decoding apparatus.

Referring to FIG. 9, the coding apparatus determines an inter prediction mode for the current block (S900). Various inter prediction modes may be used for the prediction of the current block in the picture. For example, various modes, such as a merge mode, a skip mode, a motion vector prediction (MVP) mode, an affine mode, a subblock merge mode, a merge with MVD (MMVD) mode, and a historical motion vector prediction (HMVP) mode may be used. A decoder side motion vector refinement (DMVR) mode, an adaptive motion vector resolution (AMVR) mode, a bi-prediction with CU-level weight (BCW), a bi-directional optical flow (BDOF), and the like may be further used as additional modes. The affine mode may also be referred to as an affine motion prediction mode. The MVP mode may also be referred to as an advanced motion vector prediction (AMVP) mode. In the present document, some modes and/or motion information candidates derived by some modes may also be included in one of motion information-related candidates in other modes. For example, the HMVP candidate may be added to the merge candidate of the merge/skip modes, or also be added to an mvp candidate of the MVP mode. If the HMVP candidate is used as the motion information candidate of the merge mode or the skip mode, the HMVP candidate may be referred to as the HMVP merge candidate.

The prediction mode information indicating the inter prediction mode of the current block may be signaled from the encoding apparatus to the decoding apparatus. In this case, the prediction mode information may be included in the bitstream and received by the decoding apparatus. The prediction mode information may include index information indicating one of multiple candidate modes. Alternatively, the inter prediction mode may be indicated through a hierarchical signaling of flag information. In this case, the prediction mode information may include one or more flags. For example, whether to apply the skip mode may be indicated by signaling a skip flag, whether to apply the merge mode may be indicated by signaling a merge flag when the skip mode is not applied, and it is indicated that the MVP mode is applied or a flag for additional distinguishing may be further signaled when the merge mode is not applied. The affine mode may be signaled as an independent mode or signaled as a dependent mode on the merge mode or the MVP mode. For example, the affine mode may include an affine merge mode and an affine MVP mode.

The coding apparatus derives motion information for the current block (S910). Motion information derivation may be derived based on the inter prediction mode.

The coding apparatus may perform inter prediction using motion information of the current block. The encoding apparatus may derive optimal motion information for the current block through a motion estimation procedure. For example, the encoding apparatus may search a similar reference block having a high correlation in units of a fractional pixel within a predetermined search range in the reference picture by using an original block in an original picture for the current block and derive the motion information through the searched reference block. The similarity of the block may be derived based on a difference of phase based sample values. For example, the similarity of the block may be calculated based on a sum of absolute differences (SAD) between the current block (or a template of the current block) and the reference block (or the template of the reference block). In this case, the motion information may be derived based on a reference block having a smallest SAD in a search area. The derived motion information may be signaled to the decoding apparatus according to various methods based on the inter prediction mode.

The coding apparatus performs inter prediction based on motion information for the current block (S920). The coding apparatus may derive prediction sample(s) for the current block based on the motion information. A current block including prediction samples may be referred to as a predicted block.

Meanwhile, the above-described decoded picture buffer (DPB) may be conceptually constructed with a sub-DPB, and the sub-DPB may include a picture storage buffer for storing a decoded picture of one layer. The picture storage buffer may include a decoded picture that is marked as "used for reference" or is retained for future output.

In addition, for multilayer bitstreams, the DPB parameter may not be allocated to each Output Layer Set (OLS), but instead may be allocated to each layer. For example, a maximum of (two DPB parameters may be allocated to each layer. one may be allocated when the layer is an output layer (i.e., for example, when the layer can be used for reference and future output), and the other one may be allocated when the layer is not an output layer, but is used as a reference layer (e.g., when there is no layer switching, and when the layer can be used only as a reference of a picture/slice/block of an output layer). This is considered simpler when compared to the DPB parameter for the multilayer bitstream of the HEVC layered extension, where each layer of the OLS has its own DPB parameter.

For example, the signaling of the DPB parameter may be like the syntax and semantic below.

TABLE 1

| | Descriptor |
|---|---|
| video_parameter_set_rbsp( ) { | |
| ... | |
|   if( !vps_all_independent_layers_flag) | |
|     vps_num_dpb_params | ue(v) |
|   if( vps_num_dpb_params > 0 ) { | |
|     same_dpb_size_output_or_nonoutput_flag | u(1) |
|     if( vps_max_sublayers_minus1 > 0 ) | |
|       vps_sublayer_dpb_params_present_flag | u(1) |
|   } | |
|   for( i = 0; i < vps num dpb params: i++ ) { | |
|     dpb_size_only_flag[ i ] | u(1) |
|     if( vps_max_sublayers_minus1 > 0 && !vps_all_layers_same_num_subl ayers_flag) | |
|       dpb_max_temporal_id| i ] | u(3) |
|     dpb_parameters( dpb_size_only_flag[ i ], dpb_max_temporal_id[ i ], vps_sublayer_dpb_params_present_flag) | |
|   } | |
|   for( i = 0; i < vps_max_layers_minusl && vps_num_dpb_params > 1; i++ ) | |
|   { | |

TABLE 1-continued

| | Descriptor |
|---|---|
|     if( !vps_independent_layer_flag[ i ] ) | |
|         layer_output_dpb_params_idx[ i ] | ue(v) |
|     if(LayerUsedAsRefLayerFlag[i ] && ! same_dpb_size_output_or_nonoutput_flag ) | |
|         layer_nonoutput_dpb_params_idx[ i ] | ue(v) |
|   } | |
|   ... | |
| } | |

For example, Table 1 described above may represent a Video Parameter Set (VPS) including syntax elements for a signaled DPB parameter.

Semantics for the syntax elements shown in Table 1 above may be as follows.

TABLE 2 vps_num_dpb_params specifies the number of dpb_parameters( ) syntax strutcures in the VPS. The value of vps_num_dpb_params shall be in the range of 0 to 16, inclusive. When not present, the value of vps_num_dpb_params is inferred to be equal to 0.
same_dpb_size_output_or_nonoutput_flag equal to 1 specifies that there is no layer_nonoutput_dpb_params_idx[ i ] syntax element present in the VPS.
same_dpb_size_output_or_nonoutput_flag equal to 0 specifies that there may or may not be layer_nonoutput_dpb_params_idx[ i ] syntax elements present in the VPS.
vps_sublayer_dpb_params_present_flag is used to control the presence of
max_dec_pic_buffering_minus1[ ], max_num_reorder_pics[ ], and
max_latency_increase_plus1[ ] syntax elements in the dpb_parameters( ) syntax strucures in the VPS. When not present, vps_sub_dpb_params_info_present_flag is inferred to be equal to 0.
dpb_size_only_flag[ i ] equal to 1 specifies that the max_num_reorder_pics[ ] and max_latency_increase_plus1[ ] syntax elements are not present in the i-th dpb_parameters( ) syntax strucures the VPS. dpb_size_only_flag[ i ] equal to 0 specifies that the max_num_reorder_pics[ ] and max_latency_increase_plus1[ ] syntax elements may be present in the i-th dpb_parameters( ) syntax strucures the VPS.
dpb_max_temporal_id[ i ] specifies the TemporalId of the highest sublayer representation for which the DPB parameters may be present in the i-th dpb_parameters( ) syntax strutcure in the VPS. The value of dpb_max_temporal_id[ i ] shall be in the range of 0 to vps_max_sublayers_minus1, inclusive. When vps_max_sublayers_minus1 is equal to 0, the value of dpb_max_temporal_id[ i ] is inferred to be equal to 0. When vps_max_sublayers_minus1 is greater than 0 and vps_all_layers_same_num_sublayers_flag is equal to 1, the value of dpb_max_temporal_id[ i ] is inferred to be equal to vps_max_sublayers_minus1.
layer_output_dpb_params_idx[ i ] specifies the index, to the list of dpb_parameters( ) syntax structures in the VPS, of the dpb_parameters( ) syntax structure that applies to the i-th layer when it is an output layer in an OLS. When present, the value of layer_output_dpb_params_idx[ i ] shall be in the range of 0 to vps_num_dpb_params − 1, inclusive.
If vps_independent_layer_flag[ i ] is equal to 1, the dpb_parameters( ) syntax structure that applies to the i-th layer when it is an output layer is the dpb_parameters( ) syntax structure present in the SPS referred to by the layer.
Otherwise (vps_independent_layer_flag[ i ] is equal to 0), the following applies:
- When vps_num_dpb_params is equal to 1, the value of
  layer_output_dpb_params_idx[ i ] is inferred to be equal to 0.
- It is a requirement of bitstream conformance that the value of
  layer_output_dpb_params_idx[ i ] shall be such that
  dpb_size_only_flag[ layer_output_dpb_params_idx[ i ] ] is equal to 0.
layer_nonoutput_dpb_params_idx[ i ] specifies the index, to the list of dpb_parameters( ) syntax structures in the VPS, of the dpb_parameters( ) syntax structure that applies to the i-th layer when it is a non-output layer in an OLS. When present, the value of layer_nonoutput_dpb_params_idx[ i ] shall be in the range of 0 to vps_num_dpb_params − 1, inclusive.
If same_dpb_size_output_or_nonoutput_flag is equal to 1, the following applies:
- If vps_independent_layer_flag[ i ] is equal to 1, the dpb_parameters( ) syntax structure
  that applies to the i-th layer when it is a non-output layer is the dpb_parameters( )
  syntax structure present in the SPS referred to by the layer.
- Otherwise (vps_independent_layer_flag[ i ] is equal to 0), the value of
  layer_nonoutput_dpb_params_idx[ i ] is inferred to be equal to
  layer_output_dpb_params_idx[ i ].
Otherwise (same_dpb_size_output_or_nonoutput_flag is equal to 0), when vps_num_dpb_params is equal to 1, the value of layer_output_dpb_params_idx[ i ] is inferred to be equal to 0.

For example, the syntax element vps_num_dpb_params may represent the number of dpb_parameters( ) syntax structures in the VPS. For example, the value of vps_num_dpb_params may be in the range of 0 to 16. Also, when the syntax element vps_num_dpb_params is not present, the value of the syntax element vps_num_dpb_params may be inferred to be equal to 0.

Also, for example, the syntax element same_dpb_size_output_or_nonoutput_flag may indicate whether the syntax element layer_nonoutput_dpb_params_idx[i] may be present in the VPS. For example, when the value of the syntax element same_dpb_size_output_or_nonoutput_flag is 1, the syntax element same_dpb_size_output_or_nonoutput_flag may indicate that syntax element layer_nonoutput_dpb_params_idx[i] is not present in the VPS, while, when the value of the syntax element same_dpb_size_output_or_nonoutput_flag is 0, the syntax element same_dpb_size_output_or_nonoutput_flag may indicate that the syntax element layer_nonoutput_dpb_params_idx[i] may be present in the VPS.

Also, for example, the syntax element vps_sublayer_dpb_params_present_flag may be used to control the presence of syntax elements max_dec_pic_buffering_minus1[ ], max_num_reorder_pics[ ], and max_latency_increase_plus1[ ] in the dpb_parameters( ) syntax structure of the VPS. Also, when the syntax element vps_sublayer_dpb_params_present_flag is not present, the value of the syntax element vps_sublayer_dpb_params_present_flag may be inferred to be equal to 0.

Also, for example, the syntax element dpb_size_only_flag[i] may indicate whether the syntax elements max_num_reorder_pics[ ] and max_latency_increase_plus1[ ] may be present in the i-th dpb_parameters( ) syntax structure of the VPS. For example, when the value of the syntax element dpb_size_only_flag[i] is 1, the syntax element dpb_size_only_flag[i] indicates that the syntax elements max_num_reorder_pics[ ] and max_latency_increaseplus1[ ] are not present in the i-th dpb_parameters( ) syntax structure of the VPS, while, when the value of the syntax element dpb_size_only_flag[i] is 0, the syntax element dpb_size_only_flag[i] may indicate that the syntax elements max_num_reorder_pics[ ] and max_latency_increase_plus1[ ] may be present in the i-th dpb_parameters( ) syntax structure of the VPS.

Also, for example, the syntax element dpb_max_temporal_id[i] may indicate the TemporalId of the highest sublayer representation in which the DPB parameter may exist in the i-th dpb_parameters( ) syntax structure in the VPS. Also, the value of dpb_max_temporal_id[i] may be in the range of 0 to vps_max_sublayers_minus1. Also, for example, when the value of vps_max_sublayers_minus1 is 0, the value of dpb_max_temporal_id[i] may be inferred to be 0. Also, for example, when the value of vps_max_sublayers_minus1 is greater than 0 and vps_all_layers_same_num_sublayers_flag is 1, the value of dpb_max_temporal_id[i] may be inferred to be equal to vps_max_sublayers_minus1.

Also, for example, the syntax element layer_output_dpb_params_idx[i] may specify the index of the dpb_parameters( ) syntax structure applied to the i-th layer, which is the output layer of the OLS, to the list of dpb_parameters( ) syntax structures of the VPS. When the syntax element layer_output_dpb_params_idx[i] is present, the value of the syntax element layer_output_dpb_params_idx[i] may be in the range of 0 to vps_num_dpb_params−1.

For example, when vps_independent_layer_flag[i] is 1, the dpb_parameters( ) syntax structure applied to the i-th layer which is the output layer may be the dpb_parameters( ) syntax structure present in the SPS referred to by the layer.

Alternatively, for example, when vps_independent_layer_flag[i] is 0, the following may be applied.
  When vps_num_dpb_params is 1, the value of layer_output_dpb_params_idx[i] may be inferred to be equal to 0.
  It may be a requirement of bitstream conformance that the value of layer_output_dpb_params_idx[i] is such that the value of dpb_size_only_flag[layer_output_dpb_params_idx[i]] is equal to 0.

Also, for example, the syntax element layer_nonoutput_dpb_params_idx[i] may specify the index of the dpb_parameters( ) syntax structure applied to the i-th layer, which is a non-output layer of the OLS, to the list of the dpb_parameters( ) syntax structure of the VPS. When the syntax element layer_nonoutput_dpb_params_idx[i] is present, the value of the syntax element layer_nonoutput_dpb_params_idx[i] may be in the range of 0 to vps_num_dpb_params−1.

For example, when same_dpb_size_output_or_nonoutput_flag is 1, the following may be applied.
  When vps_independent_layer_flag[i] is 1, the dpb_parameters( ) syntax structure applied to the i-th layer which is a non-output layer may be the dpb_parameters( ) syntax structure present in the SPS referred by the layer.
  When vps_independent_layer_flag[i] is 0, the value of layer_nonoutput_dpb_params_idx[i] may be inferred to be equal to layer_output_dpb_params_idx[i].

Alternatively, for example, when same_dpb_size_output_or_nonoutput_flag is 0, and when vps_num_dpb_params is 1, the value of layer_output_dpb_params_idx[i] may be inferred to be 0.

Meanwhile, for example, the dpb_parameters( ) syntax structure may be like the syntax and semantic below.

TABLE 3

| | Descriptor |
|---|---|
| dpb_parameters( dpbSizeOnlyFlag, maxSubLayersMinus1, subLayerInfoFlag ) { | |
|   for( i = ( subLayerInfoFlag ? 0 : maxSubLayersMinus1 ); | |
|     i <= maxSubLayersMinus1; i++) { | |
|     max_dec_pic_buffering_minus1[ i ] | ue(v) |
|     if( !dpbSizeOnlyFlag ) { | |
|       max_num_reorder_pics[ i ] | ue(v) |
|       max_latency_increase_plus1[ i ] | ue(v) |
|     } | |
|   } | |
| } | |

Referring to Table 3, the dpb_parameters( ) syntax structure may provide information on the DPB size for each CLVS of the CVS, the maximum picture reorder number, and the maximum latency. The dpb_parameters( ) syntax structure may be represented as information on DPB parameters or DPB parameter information.

When the dpb_parameters( ) syntax structure is included in the VPS, the OLS to which the dpb_parameters( ) syntax structure is applied may be specified by the VPS. In addition, when the dpb_parameters( ) syntax structure is included in the SPS, the dpb_parameters( ) syntax structure may be applied to an OLS including only the lowest layer among the layers making reference to the SPS, wherein the lowest layer may be an independent layer.

Semantics for the syntax elements shown in Table 3 above may be as follows.

TABLE 4 max_dec_pic_buffering_minus1[ i ] plus 1 specifies, for each for each CLVS of the CVS, the maximum required size of the DPB in units of picture storage buffers when Htid is equal to i. The value of max_dec_pic_buffering_minus1[ i ] shall be in the range of 0 to MaxDpbSize − 1, inclusive, where MaxDpbSize is as specified in clause A.4.2. When i is greater than 0, max_dec_pic_buffering_minus1[ i ] shall be greater than or equal to max_dec_pic_buffering_minus1[ i − 1 ]. When max_dec_pic_buffering_minus1[ i ] is not present for i in the range of 0 to maxSubLayersMinus1 − 1, inclusive, due to subLayerInfoFlag being equal to 0, it is inferred to be equal to max_dec_pic_buffering_minus1[ maxSubLayersMinus1 ].
max_num_reorder_pics[ i ] specifies, for each CLVS of the CVS, the maximum allowed number of pictures of the CLVS that can precede any picture in the CLVS in decoding order and follow that picture in output order when Htid is equal to i. The value of max_num_reorder_pics[ i ] shall be in the range of 0 to max_dec_pic_buffering_minus1[ i ], inclusive. When i is greater than 0, max_num_reorder_pics[ i ] shall be greater than or equal to max_num_reorder_pics[ i − 1 ]. When max_num_reorder_pics[ i ] is not present for i in the range of 0 to maxSubLayersMinus1 − 1, inclusive, due to subLayerInfoFlag being equal to 0, it is inferred to be equal to max_num_reorder_pics[ maxSubLayersMinus1 ].
max_latency_increase_plus1[ i ] not equal to 0 is used to compute the value of MaxLatencyPictures[ i ], which specifies, for each CLVS of the CVS, the maximum number of pictures in the CLVS that can precede any picture in the CLVS in output order and follow that picture in decoding order when Htid is equal to i.
When max_latency_increase_plus1[ i ] is not equal to 0, the value of MaxLatencyPictures[ i ] is specified as follows:
   MaxLatencyPictures[ i ] =
     max_num_reorder_pics[ i ] + max_latency_increase_plus1[ i ] − 1     (7-73)
When max_latency_increase_plus1[ i ] is equal to 0, no corresponding limit is expressed.
The value of max_latency_increase_plus1[ i ] shall be in the range of 0 to $2^{32}$ − 2, inclusive.
When max_latency_increase_plus1[ i ] is not present for i in the range of 0 to maxSubLayersMinus1 − 1, inclusive, due to subLayerInfoFlag being equal to 0, it is inferred to be equal to max_latency_increase_plus1[ maxSubLayersMinus1 ].

For example, the syntax element max_dec_pic_buffering_ minus1[i] plus1 may specify, for each CLVS of the CVS, the maximum required size of the DPB in units of picture storage buffers when Htid is equal to i. For example, max_dec-pic_buffering_minus1[i] may be information on the DPB size. For example, the value of the syntax element max-dec_pic_buffering_minus1[i] may be in the range of 0 to MaxDpbSize −1. Also, for example, when i is greater than 0, max_dec_pic_buffering_minus1[i] may be greater than or equal to max_dec_pic_buffering_minus1[i−1]. Also, for example, if max_dec_pic_buffering_minus1[i] for i in the range of 0 to maxSubLayersMinus1−1 is not present, due to subLayerInfoFlag being equal to 0, the value of the syntax element max_dec_pic_buffering_minus1[i] may be inferred to be equal to max_dec_pic_buffering_minus1[maxSubLayersMinus1].

Also, for example, the syntax element max_num_reorder_pics[i] may specify, for each CLVS of CVS, the maximum allowed number of pictures of the CLVS that can precede all pictures of CLVS in decoding order and follow the corresponding picture in output order when Htid is equal to i. For example, max_num_reorder_pics[i] may be information on the maximum picture reorder number of the DPB. The value of max_num_reorder_pics[i] may be in the range of 0 to max_decpic_buffering_minus1[i]. Also, for example, when i is greater than 0, max_num_reorder_pics[i] may be greater than or equal to max_num_reorder_pics[i−1]. Also, for example, if max_num_reorder_pics[i] for i in the range of 0 to maxSubLayersMinus1−1 is not present, due to subLayerInfoFlag being equal to 0, the syntax element max_num_reorder_pics[i] may be inferred to be equal to max_num_reorder_pics[maxSubLayersMinus1].

Also, for example, a syntax element max_latency_increase_plus1[i] whose value is not 0 may be used to calculate the value of MaxLatencyPictures[i]. The MaxLatencyPictures[i] may specify, for each CLVS of CVS, the maximum number of pictures of the CLVS that can precede all pictures of CLVS in output order and follow the corresponding picture in decoding order when Htid is equal to i. For example, max_latency_increase_plus1[i] may be information on the maximum latency of the DPB.

For example, when max_latency_increase_plus11[i] is not 0, the value of MaxLatencyPictures[i] may be derived as following equation.

MaxLatencyPictures[$i$]=max_num_reorder_pics[$i$]+ max_latency_increase_plus1[$i$]−1    [Equation 1]

Meanwhile, for example, if max_latency_increase_plus1 [i] is 0, no corresponding limit may be expressed. The value of the max_latency_increase_plus1[i] may be in the range of 0 to 232-2. Also, for example, if max_latency_increase_ plus1[i] for i in the range of 0 to maxSubLayersMinus1−1 is not present, due to subLayerInfoFlag being equal to 0, the syntax element max_latency_increase_plus1[i] may be inferred to be equal to max_latency_increase_plus1[maxSubLayersMinus1].

Meanwhile, the DPB parameter may be used for output and removal of a picture process as shown in the following table.

TABLE 5

The DPB parameter is used in the output and removal of picture process as follows:
The output and removal of (decoded) pictures from the DPB before the decoding of the
current picture (but after parsing the slice header of the first slice of the current picture)
happens instantaneously when the first DU of the AU containing the current picture is
removed from the CPB and proceeds as follows:
- The decoding process for reference picture list construction as specified in clause 8.3.2
  and decoding process for reference picture marking as specified in clause 8.3.3 are
  invoked.
- If the current picture is a CLVSS picture that is not picture 0, the following ordered steps
  are applied:
  1. The variable NoOutputOfPriorPicsFlag is derived for the decoder under test as
     follows:
     - If the value of pic_width_max_in_luma_samples,
       pic_height_max_in_luma_samples, chroma_format_idc,
       separate_colour_plane_flag, bit_depth_minus8, or
       max_dec_pic_buffering_minus1[ Htid ] derived for any picture of the current
       AU is different from the value of pic_width_max_in_luma_samples,
       pic_height_max_in_luma_samples, chroma_format_idc,
       separate_colour_plane_flag, bit_depth_minus8, or
       max_dec_pic_buffering_minus1[ Htid ], respectively, for the preceding picture
       in the same CLVS, NoOutputOfPriorPicsFlag may (but should not) be set to 1
       by the decoder under test, regardless of the value of
       no_output_of_prior_pics_flag.
       NOTE - Although setting NoOutputOfPriorPicsFlag equal to
       no_output_of_prior_pics_flag is preferred under these conditions, the
       decoder under test is allowed to set NoOutputOfPriorPicsFlag to 1 in this
       case.
     - Otherwise, NoOutputOfPriorPicsFlag is set equal to
       no_output_of_prior_pics_flag.
  2. The value of NoOutputOfPriorPicsFlag derived for the decoder under test is applied
     for the HRD as follows:
     - If NoOutputOfPriorPicsFlag is equal to 1, all picture storage buffers in the DPB
       are emptied without output of the pictures they contain and the DPB fullness is
       set equal to 0.
     - Otherwise (NoOutputOfPriorPicsFlag is equal to 0), all picture storage buffers
       containing a picture that is marked as "not needed for output" and "unused for
       reference" are emptied (without output) and all non-empty picture storage
       buffers in the DPB are emptied by repeatedly invoking the "bumping" process
       specified in clause C.5.2.4 and the DPB fullness is set equal to 0.
- Otherwise (the current picture is not a CLVSS picture), all picture storage buffers
  containing a picture which are marked as "not needed for output" and "unused for
  reference" are emptied (without output). For each picture storage buffer that is emptied,
  the DPB fullness is decremented by one. When one or more of the following conditions
  are true, the "bumping" process specified in clause C.5.2.4 is invoked repeatedly while
  further decrementing the DPB fullness by one for each additional picture storage buffer
  that is emptied, until none of the following conditions are true:
- The number of pictures in the DPB that are marked as "needed for output" is greater
  than max_num_reorder_pics[ Htid ].
- max_latency_increase_plus1[ Htid ] is not equal to 0 and there is at least one picture in
  the DPB that is marked as "needed for output" for which the associated variable
  PicLatencyCount is greater than or equal to MaxLatencyPictures[ Htid ].
- The number of pictures in the DPB is greater than or equal to
  max_dec_pic_buffering_minus1[ Htid ] + 1.

Meanwhile, the DPB parameter signaling design in the conventional VVC standard may have at least the following problems.

First, the VVC draft text considered the concept of a sub-DPB, but a physical decoding apparatus can have only one DPB for decoding multilayer bitstreams. Therefore, the decoding apparatus needs to know the DPB size requirement before decoding OLS in a given multilayer bitstream, but conventional VVC draft texts do not clearly disclose how such information is made known.

For example, the DPB size required for OLS in the bitstream may not be simply derived from the sub-DPB size of each layer of the OLS. That is, the DPB size required for OLS may not simply be derived as the sum of max_dec_pic_buffering_minus1[ ]+1 values of layers in the OLS. For example, the sum of max_dec_pic_buffering_minus1[ ] +1 of each layer in the OLS may be greater than the actual DPB size. For example, in a specific access unit, since each layer in the DPB may have a different reference picture list structure, the number of reconstructed pictures of each layer in the DPB may not be the maximum, and therefore, the DPB size required for the OLS may not be simply derived from the sum of max_dec_pic_buffering_minus1[ ]+1 values of the layers in the OLS.

For example, the following table exemplarily shows pictures required for each sub-DPB to be present for a bitstream with two spatial scalability layers, a group of pictures (GOP) size of 16, and no temporal sublayer.

TABLE 6

| | | Sub-DPB 0 | | | Sub-DPB 1 | | | Total ref |
|---|---|---|---|---|---|---|---|---|
| RPL # | POC | #Ref Pics | Ref pic list | Total pics | #Ref Pics | Ref pic list | Total pics | pics in DPB + current pics |
| 1 | 48 | 3 | 16, 24, 32 | 4 | 3 | 16, 24, 32 | 4 | 8 |
| 2 | 40 | 3 | 24, 32, 48 | 4 | 3 | 24, 32, 48 | 4 | 8 |
| 3 | 36 | 4 | 24, 32, 40, 48 | 5 | 4 | 24, 32, 40, 48 | 5 | 10 |
| 4 | 34 | 5 | 24, 32, 36, 40, 48 | 6 | 4 | 32, 36, 40, 48 | 5 | 11 |
| 5 | 33 | 5 | 32, 34, 36, 40, 48 | 6 | 4 | 32, 36, 40, 48 | 5 | 11 |
| 6 | 35 | 5 | 32, 34, 36, 40, 48 | 6 | 4 | 32, 36, 40, 48 | 5 | 11 |
| 7 | 38 | 5 | 32, 34, 36, 40, 48 | 6 | 4 | 32, 36, 40, 48 | 5 | 11 |
| 8 | 37 | 6 | 32, 34, 36, 38, 40, 48 | 7 | 3 | 32, 40, 48 | 4 | 11 |
| 9 | 39 | 6 | 32, 34, 36, 38, 40, 48 | 7 | 3 | 32, 40, 48 | 4 | 11 |
| 10 | 44 | 6 | 32, 34, 36, 38, 40, 48 | 7 | 3 | 32, 40, 48 | 4 | 11 |
| 11 | 42 | 5 | 32, 36, 40, 44, 48 | 6 | 4 | 32, 40, 44, 48 | 5 | 11 |
| 12 | 41 | 5 | 32, 36, 40, 44, 48 | 6 | 4 | 32, 40, 44, 48 | 5 | 11 |
| 13 | 43 | 5 | 32, 36, 40, 44, 48 | 6 | 4 | 32, 40, 44, 48 | 5 | 11 |
| 14 | 46 | 4 | 32, 40, 44, 48 | 5 | 4 | 32, 40, 44, 48 | 5 | 10 |
| 15 | 45 | 5 | 32, 40, 44, 46, 48 | 6 | 4 | 32, 40, 44, 48 | 5 | 11 |
| 16 | 47 | 5 | 32, 40, 44, 46, 48 | 6 | 4 | 32, 40, 44, 48 | 5 | 11 |
| | | | Max pics | 7 | | Max pics | 5 | 11 |

Referring to Table 6, the base layer (i.e, layer 0) may have a more complex RPL structure than layer 1, and the size of sub DPB 0 may include more reference pictures than sub DPB 1 in consideration of the picture size between the two layers. Also, for example, as shown in Table 6, the maximum number of reference pictures of the two layers (i.e., 12) may be greater than the number of actual total pictures of the DPB (i.e., 11).

Second, the bumping process may not be invoked when it is actually needed. When using the above-described example, the number of pictures of sub-DPB 1 does not reach the maximum sub-DPB size after the first slice header of a picture having a picture order count (POC) 37 of the second layer has been decoded, and thus the bumping process may not be invoked. That is, if the picture having POC 37 is included, the number of pictures of sub-DPB 1 may be 4, and the maximum number of pictures of sub-DPB 1 may increase up to 5. However, since the maximum number of pictures of the DPB has already been reached, the bumping process must be invoked at the corresponding time. Such problem may occur because only the DPB parameter of the current layer is checked under the condition that the bumping process is invoked. Here, for example, the bumping process may refer to a process of deriving pictures necessary for output among pictures in the DPB and removing pictures not used as references from the DPB.

Accordingly, this document proposes a solution to the above-described problem. The proposed embodiments may be applied individually or in combination.

As an example, a method of signaling the DPB parameter mapped to the OLS in addition to signaling the DPB parameter mapped to each layer is proposed.

Also, as an example, there may be provided a method by which the value of max_dec_pic_buffering_minus1[i] is derived such that it is equal to the value obtained by subtracting 1 from the sum of values obtained by adding 1 to max_dec_pic_buffering_minus1[i] for all layers in the OLS, when the DPB parameter does not exist since signaling of the DPB parameter mapped to the OLS may be optional. The method proposed in this embodiment may be performed based on a flag indicating whether a DPB parameter mapped to the OLS is present. For example, when the value of the flag is 1, the flag may indicate that the DPB parameter index for all OLSs including at least one or more layers are present, or otherwise, that is, when the value of the flag is 0, the flag may indicate that a DPB parameter mapped to the OLS (i.e., the DPB parameter index for the OLS) is not present. Meanwhile, for example, the flag may be present for each OLS.

Also, as an example, there may be provided a method by which the value of max_dec_pic_buffering_minus1[highest temporal sublayer] of each OLS is not greater than the value obtained by subtracting 1 from the sum of the value obtained by subtracting 1 from MaxDpbSize and the values obtained by adding 1 to max_dec_pic_buffering_minus1 [highest temporal sublayer] of layers within the OLS.

Also, as an example, there may be proposed a method in which the DPB parameter allocated to the OLS includes only the DPB size.

Also, as an example, there may be proposed a method of updating a condition for invoking the bumping process in consideration of the number of pictures in the DPB and the value of max_decpic_buffering_minus1[i] of the OLS being processed by the decoding apparatus.

Meanwhile, for example, embodiment(s) may be applied according to the following procedure.

Figure 10:
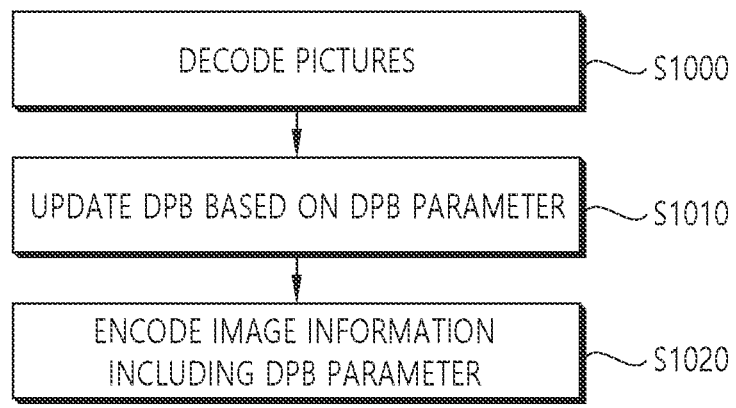
FIG. 10 illustratively represents an encoding procedure according to an embodiment of the present document.

FIG. 10 illustratively represents an encoding procedure according to an embodiment of the present document.

Referring to FIG. 10, the encoding apparatus may decode (reconstructed) pictures (S1000). The encoding apparatus may update the DPB based on the DPB parameter (S1010). For example, the decoded picture may be basically inserted into the DPB, and the decoded picture may be used as a reference picture for inter prediction. Also, a decoded picture in the DPB may be deleted based on the DPB parameter. Also, the encoding apparatus may encode image information including the DPB parameter (S1020). Also, although not shown, the encoding apparatus may further decode the current picture based on the DPB updated after step S1010. In addition, the decoded current picture may be inserted into the DPB, and the DPB including the decoded current picture may be further updated based on the DPB parameter before decoding the next picture in decoding order.

Figure 11:
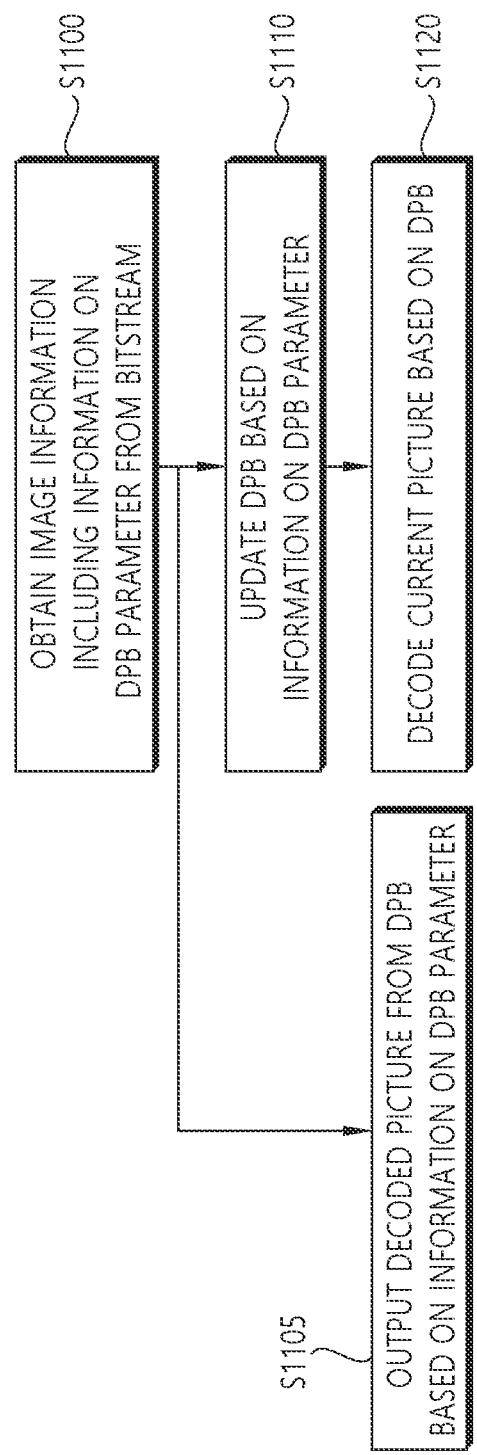
FIG. 11 illustratively represents a decoding procedure according to an embodiment of the present document.

FIG. 11 illustratively represents a decoding procedure according to an embodiment of the present document.

Referring to FIG. 11, the decoding apparatus may obtain image information including information on the DPB parameter from the bitstream (S1100). The decoding apparatus may output a picture decoded from the DPB based on the information on the DPB parameter (S1105). Meanwhile, when the layer related to the DPB (or the DPB parameter) is not an output layer but a reference layer, the step S1105 may be omitted.

Also, the decoding apparatus may update the DPB based on the information on the DPB parameter (S1110). The decoded picture may be basically inserted into the DPB. Then, the DPB may be updated before decoding the current picture. For example, a decoded picture in the DPB may be deleted based on the information on the DPB parameter. Here, the DPB updating may be referred to as DPB management.

The information on the DPB parameter may include the information/syntax element disclosed in Tables 1 and 3 described above. Additionally, for example, different DPB parameter(s) may be signaled depending on whether the current layer is an output layer or a reference layer, or different DPB parameter(s) may be signaled depending on whether the DPB (or DPB parameter) is for OLS (mapped to OLS) as in the embodiment proposed in this document.

Meanwhile, the decoding apparatus may decode the current picture based on the DPB (S1120). For example, the decoding apparatus may decode the current picture based on inter prediction for the block/slice of the current picture using the decoded picture (prior to the current picture) of the DPB as a reference picture.

Meanwhile, although not shown, the encoding apparatus may decode the current picture based on the DPB updated after the above-described step S1010. In addition, the decoded current picture may be inserted into the DPB, and the DPB including the decoded current picture may be further updated based on the DPB parameter before decoding the next picture.

The syntax and DPB management process to which the embodiments proposed in this document are applied will be described below.

As an embodiment, the signaled video parameter set (VPS) syntax may be as follows.

TABLE 7

|  | Descriptor |
|---|---|
| video_parameter_set_rbsp( ) { | |
| ... | |
|   if( !vps_all_independent_layers_flag) | |
|     vps_num_dpb_params | ue(v) |
|   if( vps_num_dpb_params > 0 ) { | |
|     same_dpb_size_output_or_nonoutput_flag | u(1) |
|     if( vps_max_sublayers_minus1 > 0 ) | |
|       vps_sublayer_dpb_params_present_flag | u(1) |
|   } | |
|   for( i = 0; i < vps_num_dpb_params; i++ ) { | |
|     dpb_size_only_flag [ i ] | u(1) |
|     if( vps_max_sublayers_minus1 > 0 && !vps_all_layers_same_num_subla yers_flag) | |
|       dpb_max_temporal_id[ i ] | u(3) |
|     dpb_parameters( dpb_size_only_flag[ i ], dpb_max_temporal_id[ i ], vps_sublayer_dpb_params_present_flag) | |
|   } | |
|   for( i = 0; i < vps_max_layers_minus1 && vps_num_dpb_params > 1; i++ ) { | |
|     if( !vps_independent_layer_flag[ i ]) | |
|       layer_output_dpb_params_idx[ i ] | ue(v) |
|     if( LayerUsedAsRefLayerFlag[ i ] && ! same_dpb_size_output_or_nonoutputflag) | |
|       layer_nonoutput_dpb_params_idx[ i ] | ue(v) |
|   } | |
|   vps_ols_dpb_params_present_flag | u(1) |
|   for( i = 0; i < TotalNumOlss && vps_ols_dpb_params_present_flag && vps_num_dpb _params > 1; i++ ) | |
|     if( NumLayersInOls[ i ] > 1 ) | |
|       ols_dpb_params_idx[ i ] | ue(v) |
| ... | |
| } | |

Referring to Table 7, the VPS may include syntax element vps_num_dpb_params, same_dpb_size_output_or_nonoutput_flag, vps_sublayer_dpb_params_present_flag, dpb_size_only_flag[i], dpb_max_temporal_id[i], layer_output_dpb_params_idx[i], and/or layer_nonoutput_dpb_params_idx[i].

In addition, referring to Table 7, the VPS may further include a syntax element vps_ols_dpb_params_present_flag and/or ols_dpb_params_idx[i].

For example, the syntax element vps_ols_dpb_params_present_flag may indicate whether ols_dpb_params_idx[ ] may be present. For example, when the value of vps_ols_dpb_params_present_flag is 1, vps_ols_dpb_params_present_flag may indicate that ols_dpb_params_idx[ ] may be present, while, when the value of vps_ols_dpb_params_present_flag is 0, vps_ols_dpb_params_present_flag may indicate that ols_dpb_params_idx[ ] is not present. Meanwhile, when vps_ols_dpb_params_present_flag is not present, the value of vps_ols_dpb_params_present_flag may be inferred to be 0.

Also, for example, when i is less than TotalNumOlss, and when vps_ols_dpb_params_present_flag is 1, and when vps_num_dpb_params is greater than 1, and if NumLayersInOls[i] is greater than 1, then the syntax element ols_dpb_params_idx[i] may be signaled. The ols_dpb_params_idx[i] may be represented as vps_ols_dpb_params_idx[i].

For example, when NumLayersInOls[i] is greater than 1, the syntax element ols_dpb_params_idx[i] may specify the index of the dpb_parameters( ) syntax structure applied to the i-th OLS, in the list of dpb_parameters( ) syntax structure of the VPS. That is, for example, the syntax element ols_dpb_params_idx[i] may indicate the dpb_parameters( ) syntax structure of the VPS for the target OLS (i.e., the i-th OLS). When ols_dpb_params_idx[i] is present, the value of ols_dpb_params_idx[i] may be in the range of 0 to vps_num_dpb_params−1.

Also, for example, when NumLayersInOls[i] is equal to 1, the dpb_parameters( ) syntax structure applied to the i-th OLS may be present in the SPS referenced by the layer in the i-th OLS.

Meanwhile, according to the present embodiment, OlsMaxDecPicBufferingMinus1[Htid] may be defined as follows.

TABLE 8

In the HRD and conformance specification, define the value of
OlsMaxDecPicBufferingMinus1[ Htid ] as follows:

...

For each bitstream conformance test, the CPB size (number of bits) is
CpbSize[ Htid ][ ScIdx ] as specified in clause 7.4.6.3, where ScIdx and the HRD parameters
and specified above in this clause, and DPB parameters
max_dec_pic_buffering_minus1[ Htid ], max_num_reorder_pics[ Htid ], and
MaxLatencyPictures[ Htid ] for each layer are found in or derived from the
dpb_parameters( ) syntax structure that applies to the layer depending on whether the layer is
an independent layer and whether the layer is an output layer of the target OLS.
For the target OLS, the value of OlsMaxDecPicBufferingMinus1[ Htid] is derived as
follows:
- If vps_ols_dpb_params_present_flag is equal to 1,
  OlsMaxDecPicBufferingMinus1[ Htid ] is equal to the value of
  max_dec_pic_buffering_minus1[ Htid ] in the ols_dpb_params_idx[ opOlsIdx ].
- Otherwise, OlsMaxDecPicBufferingMinus1[ Htid] is equal to the sum of
  max_dec_pic_buffering_minus1[ Htid ] + 1 of each layer in the target OLS minus 1.

...

For example, referring to Table 8, the value of OlsMaxDecPicBufferingMinus1[Htid] for the target OLS may be derived as follows.

For example, when the value of vps_ols_dpb_params_present_flag is 1, OlsMaxDecPicBufferingMinus1[Htid] may be derived such that it is equal to the value of max_dec_pic_buffering_minus1[Htid] in ols_dpb_params_idx [opOlsIdx].

Also, for example, in other case, that is, when the value of vps_ols_dpb_params_present_flag is 0, OlsMaxDecPicBufferingMinus1[Htid] may be derived such that it is equal to the value obtained by subtracting 1 from the sum of max_dec_pic_buffering_minus[Htid]+1 of each layer in the target OLS.

Also, according to the present embodiment, the picture output and removal process (i.e., the DPB management process) may be defined as follows.

TABLE 9

The output and removal of pictures from the DPB before the decoding of the current picture (but after parsing the slice header of the first slice of the current picture) happens instantaneously when the first DU of the AU containing the current picture is removed from the CPB and proceeds as follows:
- The decoding process for reference picture list construction as specified in clause 8.3.2 and decoding process for reference picture marking as specified in clause 8.3.3 are invoked.
- If the current picture is a CLVSS picture that is not picture 0, the following ordered steps are applied:
  1. The variable NoOutputOfPriorPicsFlag is derived for the decoder under test as follows:
     - If the value of pic_width_max_in_luma_samples, pic_height_max_in_luma_samples, chroma_format_idc, separate_colour_plane_flag, bit_depth_minus8, or max_dec_pic_buffering_minus1[ Htid ] derived for any picture of the current AU is different from the value of pic_width_max_in_luma_samples, pic_height_max_in_luma_samples, chroma_format_idc, separate_colour_plane_flag, bit_depth_minus8, or max_dec_pic_buffering_minus1[ Htid ], respectively, for the preceding picture in the same CLVS, NoOutputOfPriorPicsFlag may (but should not) be set to 1 by the decoder under test, regardless of the value of no_output_of_prior_pics_flag.
         NOTE - Although setting NoOutputOfPriorPicsFlag equal to no_output_of_prior_pics_flag is preferred under these conditions, the decoder under test is allowed to set NoOutputOfPriorPicsFlag to 1 in this case.
     - Otherwise, NoOutputOfPriorPicsFlag is set equal to no_output_of_prior_pics_flag.
  2. The value of NoOutputOfPriorPicsFlag derived for the decoder under test is applied for the HRD as follows:
     - If NoOutputOfPriorPicsFlag is equal to 1, all picture storage buffers in the DPB are emptied without output of the pictures they contain and the DPB fullness is set equal to 0.
     - Otherwise (NoOutputOfPriorPicsFlag is equal to 0), all picture storage buffers containing a picture that is marked as "not needed for output" and "unused for reference" are emptied (without output) and all non-empty picture storage buffers in the DPB are emptied by repeatedly invoking the "bumping" process specified in clause C.5.2.4 and the DPB fullness is set equal to 0.
- Otherwise (the current picture is not a CLVSS picture), all picture storage buffers containing a picture which are marked as "not needed for output" and "unused for reference" are emptied (without output). For each picture storage buffer that is emptied, the DPB fullness is decremented by one. When one or more of the following conditions are true, the "bumping" process specified in clause C.5.2.4 is invoked repeatedly while further decrementing the DPB fullness by one for each additional picture storage buffer that is emptied, until none of the following conditions are true:
- The number of pictures in the DPB that are marked as "needed for output" is greater than max_num_reorder_pics[ Htid ].
- max_latency_increase_plus1[ Htid ] is not equal to 0 and there is at least one picture in the DPB that is marked as "needed for output" for which the associated variable PicLatencyCount is greater than or equal to MaxLatencyPictures[ Htid ].
- The number of pictures in the sub-DPB is greater than or equal to max_dec_pic_buffering_minus1[ Htid ] + 1.
- The number of pictures in the DPB is greater than or equal to OlsMaxDecPicBufferingMinus1[ Htid ] + 1.

For example, referring to Table 9, the number of pictures of the sub DPB may be greater than or equal to max_dec_pic_buffering_minus1[Htid]+1. Also, for example, the number of pictures in the DPB may be greater than or equal to OlsMaxDecPicBufferingMinus1[Htid]+1.

Also, according to the present embodiment, the constraint on the maximum picture of the DPB (i.e., the maximum number of pictures of the DPB) may be updated as follows. Here, the maximum number of pictures of the DPB may be represented as the maximum DPB size.

TABLE 10

When the specified level is not level 8.5, the value of OlsMaxDecPicBufferingMinus1[ Htid ] + 1 shall be less than or equal to MaxDpbSize, which is derived as follows:
   if( PicSizeInSamplesY <= ( MaxLumaPs >> 2 ) )
     MaxDpbSize = Min( 4 * maxDpbPicBuf, 16 )
   else if( PicSizeInSamplesY <= ( MaxLumaPs >> 1 ) )
     MaxDpbSize = Min( 2 * maxDpbPicBuf, 16 )      (A.1)
   else if( PicSizeInSamplesY <= ( ( 3 * MaxLumaPs ) >> 2 ) )
     MaxDpbSize = Min( ( 4 * maxDpbPicBuf ) / 3, 16 )
   else
     MaxDpbSize = maxDpbPicBuf
where MaxLumaPs is specified in Table A.1, and maxDpbPicBuf is equal to 8.

For example, referring to Table 10, when the level is not level 8.5, the value of OlsMaxDecPicBufferingMinus1[Htid]+1 may be less than or equal to MaxDpbSize.

Alternatively, as an embodiment, the signaled video parameter set (VPS) syntax may be as follows.

TABLE 11

|  | Descriptor |
|---|---|
| video_parameter_set_rbsp( ) { |  |
|   ... |  |
|   if( !vps_all_independent_layers_flag) |  |
|     vps_num_dpb_params | ue(v) |
|   if( vps_num_dpb_params > 0 ) { |  |
|     same_dpb_size_output_or_nonoutput_flag | u(1) |
|     if( vps_max_sublayers_minus1 > 0 ) |  |
|       vps_sublayer_dpb_params_present_flag | u(1) |
|   } |  |
|   for( i = 0; i < vps_num_dpb_params; i++ ) { |  |
|     dpb_size_only_flag[ i ] | u(1) |
|     if( vps_max_sublayers_minus1 > 0 && !vps_all_layers_same_num_subla yers_flag) |  |
|       dpb_max_temporal_id[ i ] | u(3) |
|     dpb_parameters( dpb_size_only_flag[ i ], dpb_max_temporal_id[ i ], vps_sublayer_dpb_params_present_flag) |  |
|   } |  |
|   for( i = 0; i < vps_max_layers_minus 1 && vps_num_dpb_params > 1; i++ ) { |  |
|     if( !vps_independent_layer_flag[ i ]) |  |
|       layer_output_dpb_params_idx[ i ] | ue(v) |
|     if( LayerUsedAsRefLayerFlag[ i ] && !same_dpb_size_output_or_nonout put_flag) |  |
|       layer_nonoutput_dpb_params_idx[ i ] | ue(v) |
|   } |  |
|   for( i = 0; i < TotalNumOlss && vps_num_dpb_params > 1; i++) |  |
|     if(NumLayersInOls[ i ] > 1 ) { |  |
|       vps_ols_dpb_params_present_flag[ i ] | u(1) |
|       if( vps_ols_dpb params_present_flag[ i ]) |  |
|         ols_dpb_params_idx[ i ] | ue(v) |
|     } |  |
|   ... |  |
| } |  |

Referring to Table 11, the VPS may include syntax element vps_num_dpb_params, same_dpb_size_output_or_nonoutput_flag, vps_sublayer_dpb_params_present_flag, dpb_size_only_flag[i], dpb_max_temporal_id[i], layer_output_dpb_params_idx[i], and/or layer_nonoutput_dpb_params_idx[i].

In addition, referring to Table 11, the VPS may further include a syntax element vps_ols_dpb_params_present_flag and/or ols_dpb_params_idx[i].

For example, when i is less than TotalNumOlss, and when vps_num_dpb_params is greater than 1, and if NumLayersInOls[i] is greater than 1, then the syntax element vps_ols_dpb_params_present_flag may be signaled. Unlike in the embodiment shown in Table 7 above, in which vps_ols_dpb_params_present_flag is signaled without a separate condition, vps_ols_dpb_params_present_flag can be signaled only when i is less than TotalNumOlss and vps_num_dpb_params is greater than 1.

For example, the syntax element vps_ols_dpb_params_present_flag may indicate whether ols_dpb_params_idx[ ] may be present. For example, when the value of vps_ols_dpb_params_present_flag is 1, vps_ols_dpb_params_present_flag may indicate that ols_dpb_params_idx[ ] may be present, while, when the value of vps_ols_dpb_params_present_flag is 0, vps_ols_dpb_params_present_flag may indicate that ols_dpb_params_idx[ ] is not present. Meanwhile, when vps_ols_dpb_params_present_flag is not present, the value of vps_ols_dpb_params_present_flag may be inferred to be 0.

Also, for example, when vps_ols_dpb_params_present_flag is 1, a syntax element ols_dpb_params_idx[i] may be signaled.

For example, when NumLayersInOls[i] is greater than 1, the syntax element ols_dpb_params_idx[i] may specify the index of the dpb_parameters( ) syntax structure applied to the i-th OLS, in the list of dpb_parameters( ) syntax structure of the VPS. That is, for example, the syntax element ols_dpb_params_idx[i] may indicate the dpb_parameters( ) syntax structure of the VPS for the target OLS (i.e., the i-th OLS). When ols_dpb_params_idx[i] is present, the value of ols_dpb_params_idx[i] may be in the range of 0 to vps_num_dpb_params−1.

Figure 12:
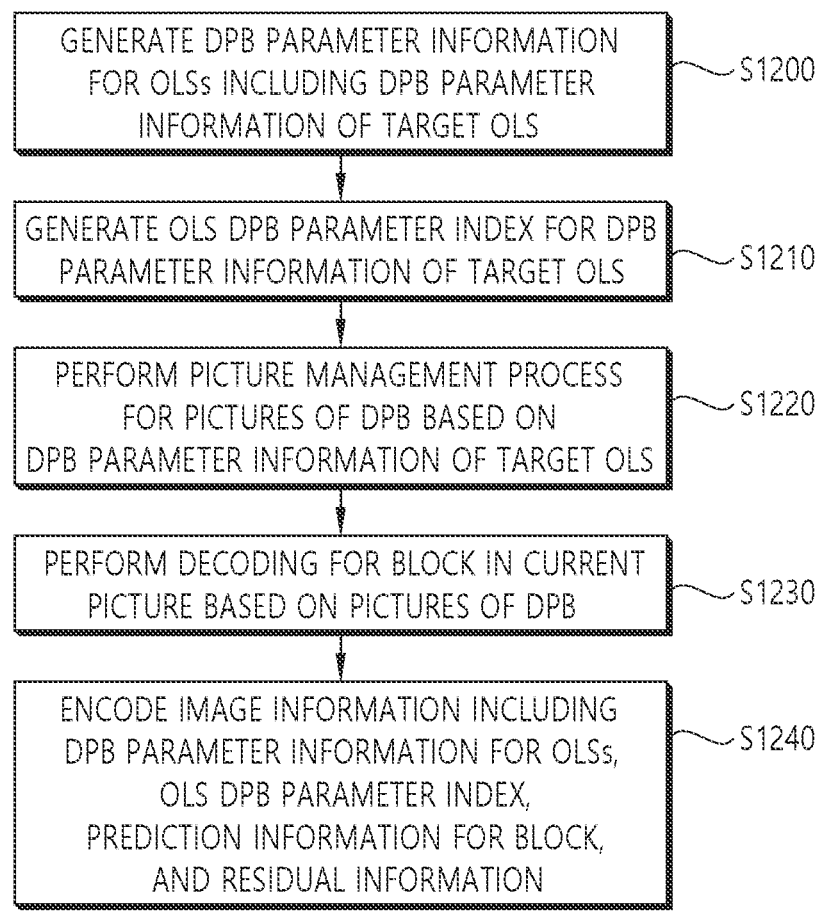
FIG. 12 briefly illustrates an image encoding method performed by an encoding apparatus according to the present disclosure.

FIG. 12 briefly illustrates an image encoding method performed by an encoding apparatus according to the present disclosure. The method disclosed in FIG. 12 may be performed by the encoding apparatus disclosed in FIG. 2. Specifically, for example, S1200 to S1210 and S1240 of FIG. 12 may be performed by the entropy encoder of the encoding apparatus; S1220 of FIG. 12 may be performed by the DPB of the encoding apparatus; and S1230 of FIG. 12 may be performed by the predictor and the residual processor of the encoding apparatus.

The encoding apparatus generates decoded picture buffer (DPB) parameter information for output layer sets (OLSs) including DPB parameter information of a target OLS (S1200). The encoding apparatus may generate and encode the DPB parameter information for the OLSs including the DPB parameter information of the target OLS. The image information may include the DPB parameter information for the OLSs. For example, a video parameter set (VPS) syntax may include the DPB parameter information for the OLSs.

For example, the DPB parameter information for the target OLS may include information on the DPB size for the target OLS, information on the maximum picture reorder number of the DBP for the target OLS, and/or information on the maximum latency of the DBP for the target OLS.

Here, the DPB size may indicate the maximum number of pictures that the DPB can include.

The syntax element of the information on the DPB size for the target OLS may be the above-described max_dec_pic_buffering_minus1[i], the syntax element of the information on the maximum picture reorder number of the DBP for the target OLS may be the above-described max_num_reorder_pics[i], and the syntax element of the information on the maximum latency of the DBP for the target OLS may be the above-described max_latency_increase_plus1[i].

The encoding apparatus generates an OLS DPB parameter index for the DPB parameter information of the target OLS (S1210). The encoding apparatus may generate and encode an OLS DPB parameter index for the DPB parameter information of the target OLS. The image information may include an OLS DPB parameter index for DPB parameter information of the target OLS. For example, the VPS syntax may include the OLS DPB parameter index.

For example, the OLS DPB parameter index for the target OLS may indicate DPB parameter information for the target OLS. For example, the OLS DPB parameter index for the target OLS may indicate DPB parameter information for the target OLS among the DPB parameter information for the OLSs. The syntax element of the OLS DPB parameter index may be the above-described vps_ols_dpb_params_idx[i] or ols_dpb_params_idx[i].

Meanwhile, for example, the encoding apparatus may generate and encode an OLS DPB parameter flag for whether the DPB parameter information for the OLSs is present. For example, the image information may include the OLS DPB parameter flag. Additionally, for example, the VPS syntax may include the OLS DPB parameter flag. For example, the OLS DPB parameter flag may indicate whether the DPB parameter information for the OLSs is present. For example, when the value of the OLS DPB parameter flag is 1, the OLS DPB parameter flag may indicate that the DPB parameter information for the OLSs may be present, while, when the value of the OLS DPB parameter flag is 0, the OLS DPB parameter flag may indicate that the DPB parameter information for the OLSs is not present. Also, for example, the OLS DPB parameter index may be generated and encoded based on the OLS DPB parameter flag. For example, when the value of the OLS DPB parameter flag is 1, the OLS DPB parameter index may be generated/encoded/signaled, while, when the value of the OLS DPB parameter flag is 0, the OLS DPB parameter index may not be generated/encoded/signaled. The syntax element of the OLS DPB parameter flag may be the above-described vps_ols_dpb_params_present_flag.

The encoding apparatus performs a picture management process for pictures of the DPB based on the DPB parameter information of the target OLS (S1220). The encoding apparatus may perform a picture management process for pictures of a DPB based on the DPB parameter information for the target OLS. The encoding apparatus may update the DPB based on the DPB parameter information. For example, the encoding apparatus may perform a picture management process for (decoded) pictures of the DPB based on the DPB parameter information. For example, the encoding apparatus may add a decoded picture to the DPB, or may remove a decoded picture in the DPB. For example, the decoded picture in the DPB may be used as a reference picture of inter prediction for the current picture, or the decoded picture in the DPB may be used as an output picture. The decoded picture may refer to a picture decoded before the current picture in decoding order in the target OLS.

Meanwhile, for example, the encoding apparatus may determine whether a bumping process for the pictures in the DPB is performed based on the number of pictures in the DPB and information on the DPB size for the target OLS, and may perform the bumping process for the picture in the DPB based on the determination result. For example, when the number of pictures in the DPB is greater than or equal to a value derived based on information on the DPB size, the bumping process may be performed, while, when the number of pictures in the DPB is less than a value derived based on the information on the DPB size, the bumping process may not be performed. Here, for example, the value derived based on the information on the DPB size may be a value obtained by adding 1 to the value of the information on the DPB size.

The encoding apparatus performs decoding for a block in a current picture based on the pictures of the DPB (S1230). The encoding apparatus may decode a block in the current picture of the target OLS based on the pictures of the DPB.

For example, the encoding apparatus may construct a reference picture list for the current picture based on the pictures of the DPB. That is, the encoding apparatus may construct a reference picture list for the current picture based on the updated pictures of the DPB. For example, the encoding apparatus may construct a reference picture list based on decoded pictures of a DPB used for inter prediction of blocks in the current picture. For example, the reference picture list for the current picture may include a picture used for inter prediction with respect to a block of the current picture among pictures of the DPB.

Then, for example, the encoding apparatus may perform inter prediction on the block in the current picture based on the reference picture list. The encoding apparatus may derive a reference picture for a block in the current picture from among reference pictures of the reference picture list for the block, and may perform inter prediction on the block based on the reference picture. The encoding apparatus may derive a prediction sample by performing inter prediction on the block based on the derived reference picture and motion information on the block. The encoding apparatus may generate a reconstructed sample and/or a reconstructed picture for the block of the current picture based on the prediction sample. Meanwhile, for example, the encoding apparatus may derive a residual sample for a block in the current picture, and may generate a reconstructed sample and/or a reconstructed picture through addition of the prediction sample and the residual sample.

Thereafter, as described above, an in-loop filtering procedure such as an ALF procedure, SAO and/or deblocking filtering may be applied as needed to the reconstructed samples in order to improve subjective/objective video quality.

The encoding apparatus encodes image information including the DPB parameter information for the OLSs, the OLS DPB parameter index, prediction information for the block, and residual information (S1240). For example, the encoding apparatus may encode the DPB parameter information, the OLS DPB parameter index, prediction information for the block, and residual information. The image information may include the DPB parameter information, the OLS DPB parameter index, prediction information for the block, and residual information. Also, the image information may include the above-described OLS DPB parameter flag.

For example, the encoding apparatus may generate and encode prediction information and residual information for a block of the current picture. In this case, various prediction methods disclosed in the present document, such as inter prediction or intra prediction, may be applied. For example, the encoding apparatus may determine whether to perform inter prediction or intra prediction on the block, and may determine specific inter prediction mode or specific intra prediction mode based on RD cost. According to the determined mode, the encoding apparatus may derive the prediction sample for the block. The prediction information may include prediction mode information for the block.

Also, the encoding apparatus may generate and encode a reference picture index indicating a reference picture for the block. For example, the prediction information may include the reference picture index. Also, the encoding apparatus may derive motion information for the block, and may generate and encode information on the motion information. For example, the prediction information may include information on the reference picture index and the motion information.

Also, for example, the encoding apparatus may encode residual information for a block of the picture. For example, the encoding apparatus may derive the residual sample through the subtraction of the original sample and the prediction sample for the block.

Thereafter, for example, the encoding apparatus may quantize the residual sample to derive a quantized residual sample, and may derive a transform coefficient based on the quantized residual sample, and may generate and encode the residual information based on the transform coefficient. Alternatively, for example, the encoding apparatus may quantize the residual sample to derive a quantized residual sample, and may derive a transform coefficient by transforming the quantized residual sample, and may generate and encode the residual information based on the transform coefficient. The image information may include the residual information. Additionally, for example, the encoding apparatus may encode image information and output it in the form of a bitstream.

Meanwhile, the bitstream including the image information may be transmitted to the decoding apparatus through a network or a (digital) storage medium. Here, the network may include a broadcast network, a communication network and/or the like, and the digital storage medium may include various storage media, such as USB, SD, CD, DVD, Blu-ray, HDD, SSD, and the like.

Figure 13:
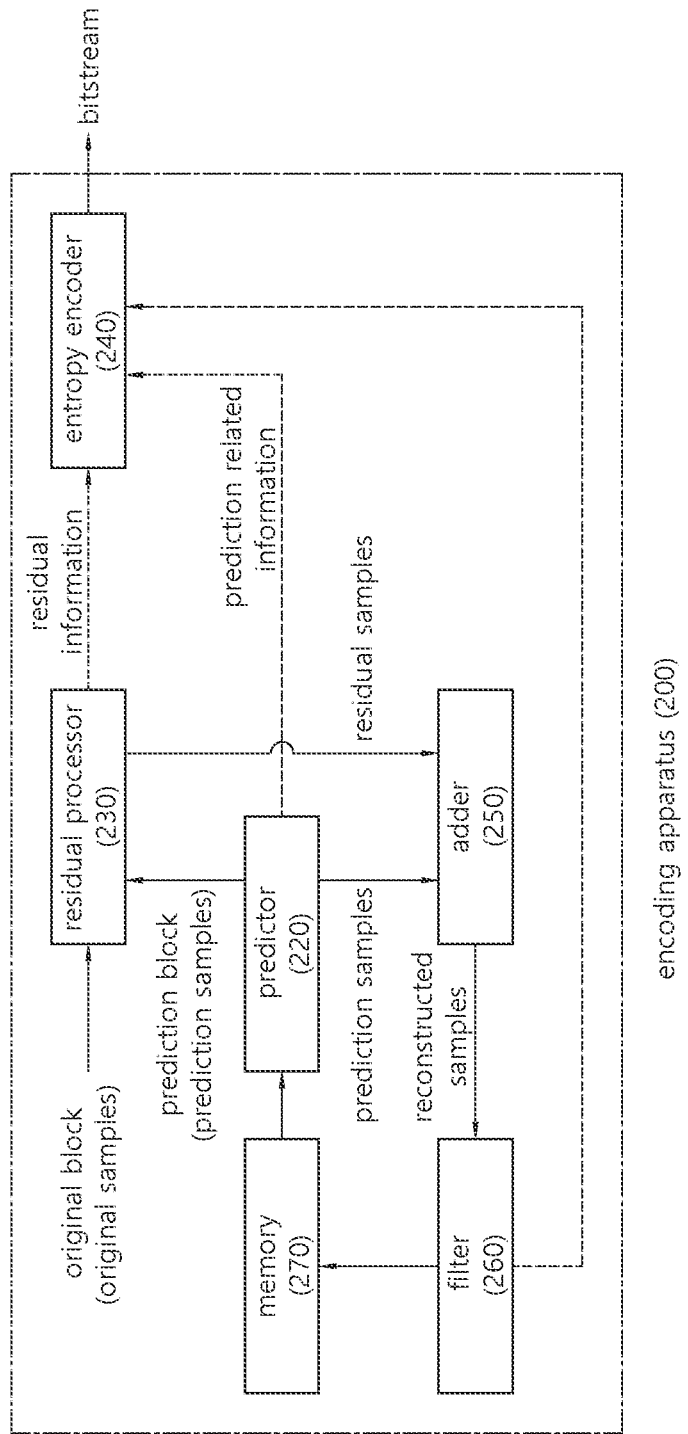
FIG. 13 briefly illustrates an encoding apparatus for performing an image encoding method according to the present disclosure.

FIG. 13 briefly illustrates an encoding apparatus for performing an image encoding method according to the present disclosure. The method disclosed in FIG. 12 may be performed by the encoding apparatus disclosed in FIG. 13. Specifically, for example, the entropy encoder of the encoding apparatus of FIG. 13 may perform S1200 to S1210 and S1240; the DPB of the encoding apparatus of FIG. 13 may perform S1220; and the predictor and the residual processor of the encoding apparatus of FIG. 13 may perform S1230.

Figure 14:
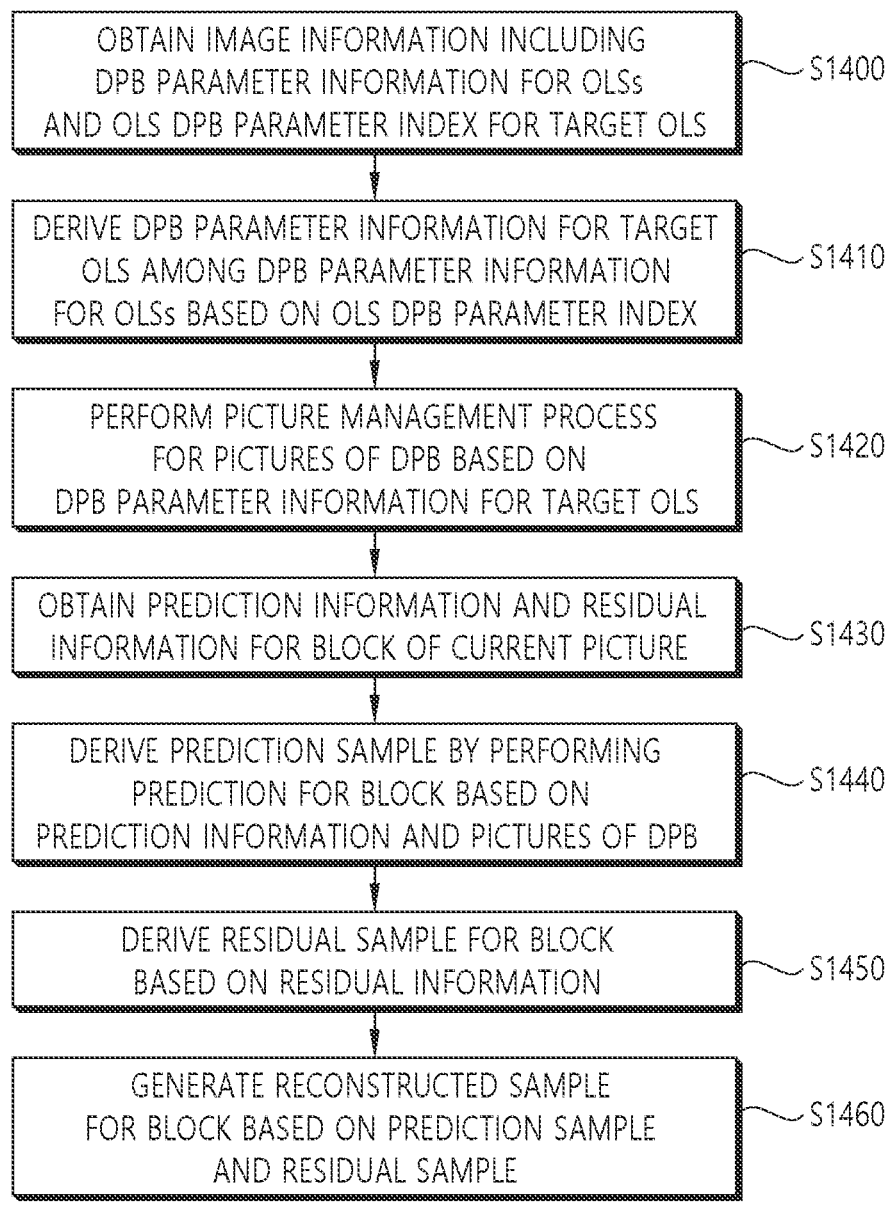
FIG. 14 briefly illustrates an image decoding method performed by a decoding apparatus according to the present disclosure.

FIG. 14 briefly illustrates an image decoding method performed by a decoding apparatus according to the present disclosure. The method disclosed in FIG. 14 may be performed by the decoding apparatus disclosed in FIG. 3. Specifically, for example, S1400 and S1430 of FIG. 14 may be performed by the entropy decoder of the decoding apparatus; S1410 to S1420 of FIG. 14 may be performed by the DPB of the decoding apparatus; S1440 of FIG. 14 may be performed by the predictor of the decoding apparatus; S1450 of FIG. 14 may be performed by the residual processor of the decoding apparatus; and S1460 of FIG. 14 may be performed by the adder of the decoding apparatus.

The decoding apparatus obtains image information including decoded picture buffer (DPB) parameter information for output layer sets (OLSs) and an OLS DPB parameter index for a target OLS (S1400). The decoding apparatus may obtain image information including decoded picture buffer (DPB) parameter information for output layer sets (OLSs) and an OLS DPB parameter index for a target OLS.

For example, the decoding apparatus may obtain a video parameter set (VPS) syntax from the bitstream. The image information may include the VPS syntax. The image information may be received as a bitstream. The VPS syntax may include the DPB parameter information for the OLSs and the OLS DPB parameter index for the target OLS. That is, for example, the decoding apparatus may obtain the DPB parameter information for the OLSs and the OLS DPB parameter index for the target OLS with the VPS syntax.

For example, the OLS DPB parameter index for the target OLS may indicate DPB parameter information for the target OLS. For example, the DPB parameter information for the OLSs may include DPB parameter information for the target OLS, and the OLS DPB parameter index for the target OLS may indicate DPB parameter information for the target OLS in the DPB parameter information for the OLSs. The syntax element of the OLS DPB parameter index may be the above-described vps_ols_dpb_params_idx[i] or ols_dpb_params_idx[i].

Meanwhile, for example, the decoding apparatus may obtain an OLS DPB parameter flag for whether the DPB parameter information for the OLSs is present. For example, the image information may include the OLS DPB parameter flag. Additionally, for example, the VPS syntax may include the OLS DPB parameter flag. For example, the OLS DPB parameter flag may indicate whether the DPB parameter information for the OLSs is present. For example, when the value of the OLS DPB parameter flag is 1, the OLS DPB parameter flag may indicate that the DPB parameter information for the OLSs may be present, while, when the value of the OLS DPB parameter flag is 0, the OLS DPB parameter flag may indicate that the DPB parameter information for the OLSs is not present. Also, for example, the OLS DPB parameter index may be obtained based on the OLS DPB parameter flag. For example, when the value of the OLS DPB parameter flag is 1, the OLS DPB parameter index may be signaled/obtained, while, when the value of the OLS DPB parameter flag is 0, the OLS DPB parameter index may not be signaled/obtained. The syntax element of the OLS DPB parameter flag may be the above-described vps_ols_dpb_params_present_flag.

The decoding apparatus derives DPB parameter information for the target OLS among the DPB parameter information for the OLSs based on the OLS DPB parameter index (S1410). The decoding apparatus may derive DPB parameter information for the target OLS among the DPB parameter information for the OLSs based on the OLS DPB parameter index. For example, the decoding apparatus may derive DPB parameter information for the target OLS indicated by the OLS DPB parameter index among the DPB parameter information for the OLSs.

For example, the DPB parameter information for the target OLS may include information on the DPB size for the target OLS, information on the maximum picture reorder number of the DBP for the target OLS, and/or information on the maximum latency of the DBP for the target OLS. Here, the DPB size may indicate the maximum number of pictures that the DPB can include.

The syntax element of the information on the DPB size for the target OLS may be the above-described max_dec_pic_buffering_minus1[i], the syntax element of the information on the maximum picture reorder number of the DBP for the target OLS may be the above-described max_num_reorder_pics[i], and the syntax element of the information on the maximum latency of the DBP for the target OLS may be the above-described max_latency_increase_plus1[ ].

The decoding apparatus performs a picture management process for pictures of a DPB based on the DPB parameter information for the target OLS (S1420). The decoding apparatus may perform a picture management process for pictures of a DPB based on the DPB parameter information for the target OLS. The decoding apparatus may update the DPB based on the DPB parameter information. For example, the decoding apparatus may perform a picture management process for (decoded) pictures of the DPB based on the DPB parameter information. For example, the decoding apparatus may add a decoded picture to the DPB, or may remove a decoded picture in the DPB. For example, the decoded picture in the DPB may be used as a reference picture of inter prediction for the current picture, or the decoded picture in the DPB may be used as an output picture. The decoded picture may refer to a picture decoded before the current picture in decoding order in the target OLS.

Meanwhile, for example, the decoding apparatus may determine whether a bumping process for the pictures in the DPB is performed based on the number of pictures in the DPB and information on the DPB size for the target OLS, and may perform the bumping process for the picture in the DPB based on the determination result. For example, when the number of pictures in the DPB is greater than or equal to a value derived based on information on the DPB size, the bumping process may be performed, while, when the number of pictures in the DPB is less than a value derived based on the information on the DPB size, the bumping process may not be performed. Here, for example, the value derived based on the information on the DPB size may be a value obtained by adding 1 to the value of the information on the DPB size.

The decoding apparatus obtains prediction information and residual information for a block of the current picture (S1430). For example, the decoding apparatus may obtain the prediction information and the residual information for the block of the current picture. The image information may include the prediction information and the residual information.

For example, the prediction information may include a reference picture index indicating a reference picture for the block. Also, for example, the prediction information may include information on motion information for the block.

Also, for example, the residual information may include information such as value information of (quantized) transform coefficients of the block, location information, a transform technique, a transform kernel, and a quantization parameter. Also, for example, the residual information may include a transform skip flag. The transform skip flag may indicate whether transform is applied to the block.

The decoding apparatus derives a prediction sample by performing prediction for the block based on the prediction information and the pictures of the DPB (S1440). The decoding apparatus may construct a reference picture list for the current picture based on the pictures of the DPB, may derive a reference picture in the reference picture list for the block based on the reference picture index for the block, and may derive a prediction sample by performing inter prediction on the block based on the motion information for the block and the reference picture. The prediction information may include a reference picture index indicating a reference picture for the block, and information on motion information for the block. The motion information for the block may be derived based on information on the motion information for the block. The decoding apparatus may construct a motion information candidate list based on neighboring blocks of the block, and may derive motion information for the block based on the information on motion information and the motion information candidate list.

The decoding apparatus derives a residual sample for the block based on the residual information (S1450).

For example, the decoding apparatus may derive a transform coefficient of the block of the current picture based on residual information included in the image information, and may derive a residual sample based on the transform coefficient. For example, when it is derived that transform is not applied to the block based on the transform skip flag (when the block is a transform skip block), that is, when the value of the transform skip flag is 1, the decoding apparatus may derive the transform coefficient as the residual sample of the block. Alternatively, for example, when it is derived that transform is not applied to the block based on the transform skip flag (when the block is a transform skip block), that is, when the value of the transform skip flag is 1, the decoding apparatus may dequantize the transform coefficient and derive the residual sample of the block. Alternatively, for example, when it is derived that transform is applied to the block based on the transform skip flag (when the block is not a transform skip block), that is, when the value of the transform skip flag is 0, the decoding apparatus may inverse transform the transform coefficient and derive the residual sample of the block. Alternatively, for example, when it is derived that transform is applied to the block based on the transform skip flag (when the block is not a transform skip block), that is, when the value of the transform skip flag is 0, the decoding apparatus may dequantize the transform coefficient, inverse transform the dequantized coefficient, and derive the residual sample of the block.

The decoding apparatus generates a reconstructed sample for the block based on the prediction sample and the residual sample (S1460). For example, the decoding apparatus may generate a reconstructed sample and/or a reconstructed picture for the block of the current picture based on the prediction sample and the residual sample. For example, the decoding apparatus may generate a reconstructed sample and/or a reconstructed picture through addition of the prediction sample and the residual sample.

Thereafter, as described above, an in-loop filtering procedure such as an ALF procedure, SAO and/or deblocking filtering may be applied as needed to the reconstructed samples in order to improve subjective/objective video quality.

Figure 15:
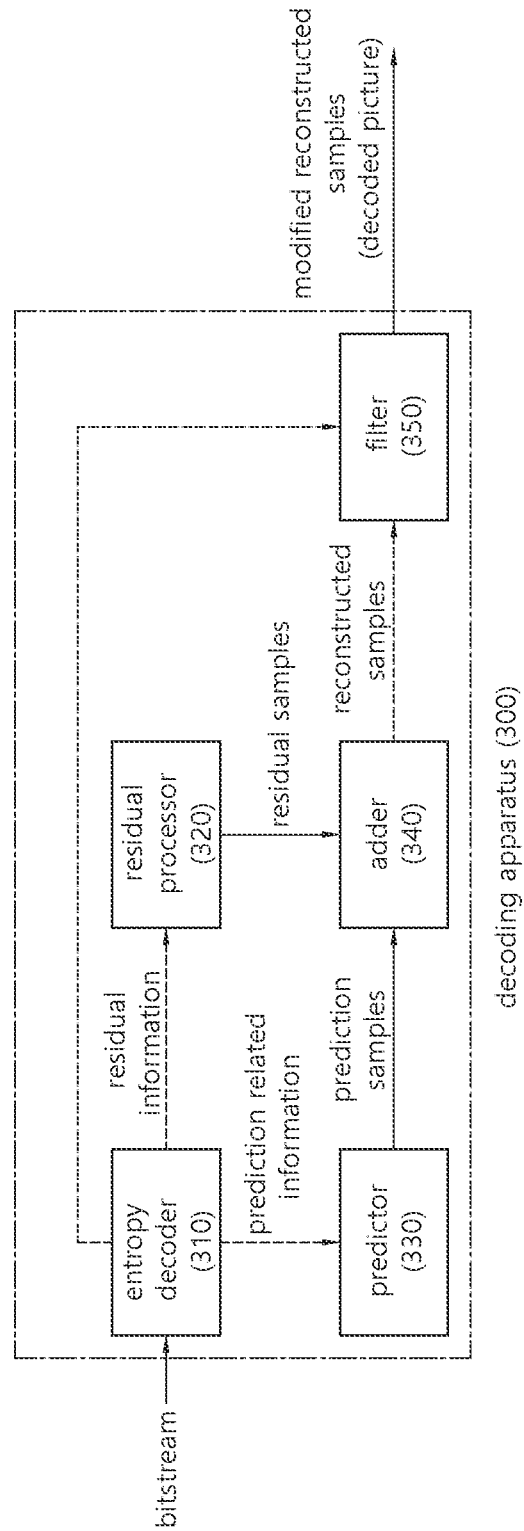
FIG. 15 briefly illustrates a decoding apparatus for performing an image decoding method according to the present disclosure.

FIG. 15 briefly illustrates a decoding apparatus for performing an image decoding method according to the present disclosure. The method disclosed in FIG. 14 may be performed by the decoding apparatus disclosed in FIG. 15. Specifically, for example, the entropy decoder of the decoding apparatus of FIG. 15 may perform S1400 and S1430 of FIG. 14; the DPB of the decoding apparatus of FIG. 15 may perform S1410 to S1420 of FIG. 14; the predictor of the decoding apparatus of FIG. 15 may perform S1440 of FIG. 14; the residual processor of the decoding apparatus of FIG. 15 may perform S1450 of FIG. 14; and the adder of the decoding apparatus of FIG. 15 may perform S1460 of FIG. 14.

According to this document described above, it is possible to signal the DPB parameter for the OLS, and through this, the DPB can be updated adaptively to the OLS, and overall coding efficiency can be improved.

In addition, according to this document, index information indicating the DPB parameter for the OLS can be signaled, and through this, the DPB parameter can be derived adaptively to the OLS, and the overall coding efficiency can be improved by updating the DPB for OLS based on the derived DPB parameter.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 16:
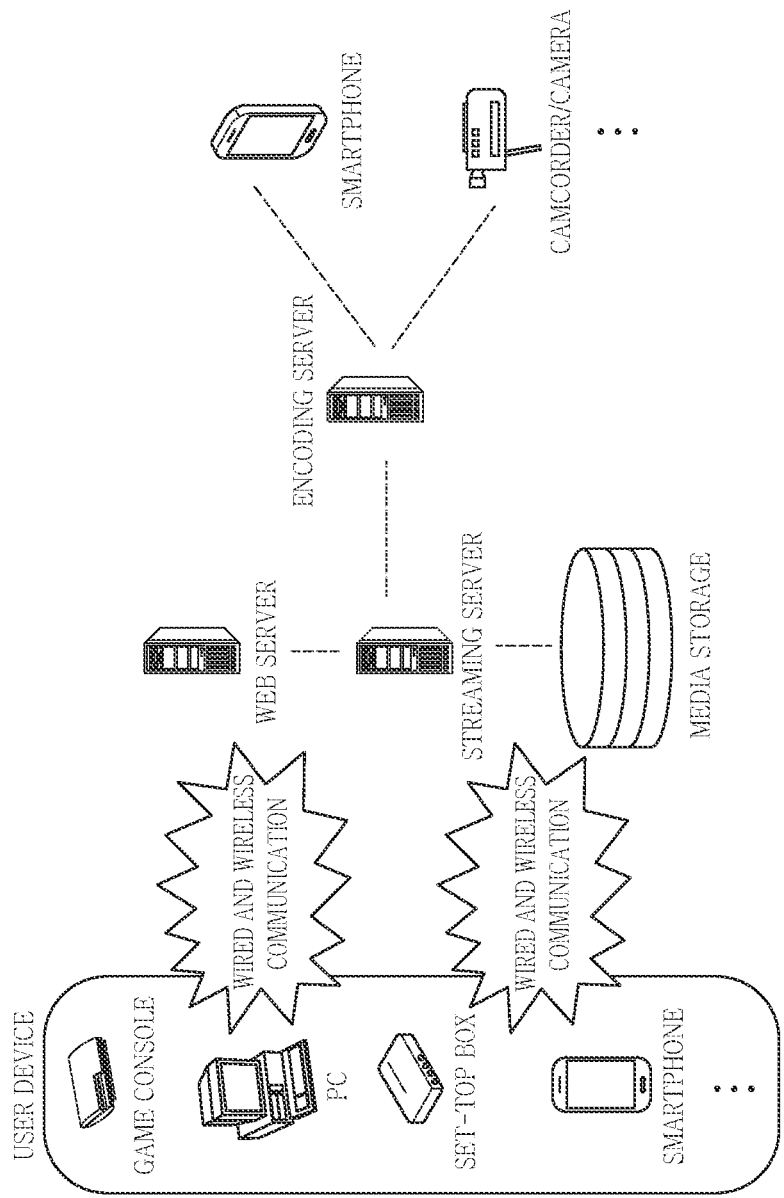
FIG. 16 illustrates a structural diagram of a contents streaming system to which the present disclosure is applied.

FIG. 16 illustrates a structural diagram of a contents streaming system to which the present disclosure is applied.

The content streaming system to which the embodiment (s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. An image decoding method performed by a decoding apparatus, the method comprising:
    obtaining Decoded Picture Buffer (DPB) parameter information for Output Layer Sets (OLSs);
    obtaining DPB parameter number information specifying a number of the DPB parameter information;
    obtaining an OLS DPB parameter index for a target OLS based on the DPB parameter number information-wherein the target OLS is one of the OLSs, and the OLS DPB parameter index specifies an index of DPB parameter information that applied to the target OLS among the DPB parameter information for the OLSs;
    deriving the DPB parameter information that applied to the target OLS among the DPB parameter information for the OLSs based on the OLS DPB parameter index;
    performing a picture management process for pictures of a DPB based on the DPB parameter information that applied to the target OLS;
    obtaining prediction information and residual information for a block of the current picture;
    deriving a prediction sample by performing prediction for the block based on the prediction information and the pictures of the DPB;
    deriving a residual sample for the block based on the residual information; and
    generating a reconstructed sample for the block based on the prediction sample and the residual sample,
    wherein the DPB parameter information that applied to the target OLS includes information on DPB size, information on maximum picture reorder number of the DPB for the target OLS, and information on maximum latency of the DPB,
    wherein performing the picture management process comprises adding a decoded picture to the DPB or removing the decoded picture from the DPB, and
    wherein the decoded picture is used as a reference picture of inter prediction or is used as an output picture.

2. The image decoding method of claim 1, wherein the DPB parameter information for the OLSs and the OLS DPB parameter index are included in a Video Parameter Set (VPS).

3. An image encoding method performed by an encoding apparatus, the method comprising:
    generating Decoded Picture Buffer (DPB) parameter information for Output Layer Sets (OLSs) including DPB parameter information that applied to a target OLS—wherein the target OLS is one of the OLSs;
    generating DPB parameter number information specifying a number of DPB parameter information;
    generating an OLS DPB parameter index for the DPB parameter information that applied to the target OLS, the OLS DPB parameter index specifying an index of the DPB parameter information that applied to the target OLS among the DPB parameter information for the OLSs;
    performing a picture management process for pictures of a DPB based on the DPB parameter information of the target OLS;
    performing decoding for a block in a current picture based on the pictures of the DPB; and
    encoding image information including the DPB parameter information for the OLSs, the DPB parameter number information, the OLS DPB parameter index, prediction information for the block, and residual information,
    wherein the OLS DPB parameter index is encoded based on the DPB parameter number information,
    wherein the DPB parameter information that applied to the target OLS includes information on DPB size, information on maximum picture reorder number of the DPB for the target OLS, and information on maximum latency of the DPB,
    wherein performing the picture management process comprises adding a decoded picture to the DPB or removing the decoded picture from the DPB, and wherein the decoded picture is used as a reference picture of inter prediction.

4. The image encoding method of claim 3, wherein the DPB parameter information and the OLS DPB parameter index are included in a Video Parameter Set (VPS).

5. A transmission method of data for image, the method comprising:
- obtaining a bitstream of image information including Decoded Picture Buffer (DPB) parameter information for Output Layer Sets (OLSs), an OLS DPB parameter index for DPB parameter information that applied to a target OLS, DPB parameter number information, prediction information andresidual information for a block in a current picture-wherein the target OLS is one of the OLSs; and
- transmitting the data including the bitstream of the image information including the DPB parameter information for the OLSs, the OLS DPB parameter index, the DPB parameter number information, the prediction information and the residual information for the block,
- wherein the DPB parameter number information specifies a number of DPB parameter information,
- wherein the OLS DPB parameter index specifies an index of the DPB parameter information that applied to the target OLS among the DPB parameter information for the OLSs,
- wherein the OLS DPB parameter index is obtained based on the DPB parameter number information,
- wherein the DPB parameter information for the OLSs includes the DPB parameter information that applied to the target OLS,
- wherein a picture management process for pictures of a DPB is performed based on the DPB parameter information that applied to the target OLS, and
- wherein decoding for the block is performed based on the pictures of the DPB,
- wherein the DPB parameter information that applied to the target OLS includes information on DPB size, information on maximum picture reorder number of the DPB for the target OLS, and information on maximum latency of the DPB,
- wherein performing the picture management process comprises adding a decoded picture to the DPB or removing the decoded picture from the DPB, and
- wherein the decoded picture is used as a reference picture of inter prediction.

* * * * *